United States Patent
Wu et al.

(10) Patent No.: US 10,116,773 B2
(45) Date of Patent: Oct. 30, 2018

(54) PACKET PROCESSING METHOD AND RELATED DEVICE THAT ARE APPLIED TO NETWORK DEVICE

(71) Applicant: Huawei Technologies Co., Ltd., Shenzhen (CN)

(72) Inventors: Jie Wu, Shenzhen (CN); Guangsheng Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 164 days.

(21) Appl. No.: 15/407,031

(22) Filed: Jan. 16, 2017

(65) Prior Publication Data

US 2017/0126855 A1  May 4, 2017

Related U.S. Application Data

(63) Continuation of application No. PCT/CN2014/082171, filed on Jul. 14, 2014.

(51) Int. Cl.
  *H04L 29/06* (2006.01)
  *H04L 12/741* (2013.01)

(52) U.S. Cl.
  CPC .............. *H04L 69/22* (2013.01); *H04L 45/74* (2013.01)

(58) Field of Classification Search
  None
  See application file for complete search history.

(56) References Cited

U.S. PATENT DOCUMENTS 6,891,834 B1 *  5/2005  Dally ................. H04L 47/10
                                      370/395.4
6,907,453 B2 *  6/2005  Shankar ............... H04L 47/621
                                      370/412

(Continued)

FOREIGN PATENT DOCUMENTS

CN        1996958 A    7/2007
CN      101286936 A   10/2008

(Continued)

OTHER PUBLICATIONS

Machine Translation and Abstract of Chinese Publication No. CN101286936, dated Oct. 15, 2008, 11 pages.

(Continued)

*Primary Examiner* — Candal Elpenord
(74) *Attorney, Agent, or Firm* — Conley Rose, P.C.

(57) ABSTRACT

K classifiers and S network service processors are deployed in a network device. A network adapter receiving queue is divided into multiple queue areas. Each classifier may acquire a packet identifier from a queue area that corresponds to the classifier and is in the network adapter receiving queue, that is, the network adapter receiving queue has multiple information reading interfaces such that the K classifiers may concurrently read packet identifiers from corresponding queue areas in the network adapter receiving queue, and the K classifiers may further concurrently determine, based on the packet identifiers acquired by the K classifiers, corresponding flow queue identifiers. Related operations before the K classifiers distribute packet description information to flow queues may all be concurrently executed, and concurrent execution makes processing times of the related operations become partially or completely overlapped.

20 Claims, 10 Drawing Sheets

| Queue area number | Classifier number |
|---|---|
| Queue area a | Classifier x |
| Queue area b | Classifier y |
| Queue area c | Classifier z |
| ....... | ....... |

(56) References Cited

U.S. PATENT DOCUMENTS

| | | | |
|---|---|---|---|
| 6,980,516 B1* | 12/2005 | Wibowo | H04L 47/10 370/235 |
| 7,613,114 B2* | 11/2009 | Iwata | H04L 12/5602 370/235 |
| 7,848,236 B2* | 12/2010 | Rinne | H04L 47/10 370/235 |
| 7,864,764 B1 | 1/2011 | Ma et al. | |
| 2002/0163909 A1* | 11/2002 | Sarkinen | H04Q 11/04 370/386 |
| 2003/0202525 A1* | 10/2003 | Nagatomo | H04L 47/2408 370/411 |
| 2005/0044252 A1 | 2/2005 | Floyd et al. | |
| 2008/0205403 A1* | 8/2008 | Akyol | H04L 45/7453 370/392 |
| 2008/0253288 A1* | 10/2008 | Aimoto | H04L 47/10 370/235.1 |
| 2011/0040706 A1 | 2/2011 | Sen et al. | |
| 2011/0310739 A1* | 12/2011 | Aybay | H04L 47/10 370/235 |
| 2012/0033550 A1* | 2/2012 | Yano | H04L 47/10 370/230 |

FOREIGN PATENT DOCUMENTS

| | | |
|---|---|---|
| CN | 101616083 A | 12/2009 |
| CN | 102624611 A | 8/2012 |
| CN | 103491190 A | 1/2014 |

OTHER PUBLICATIONS

Machine Translation and Abstract of Chinese Publication No. CN102624611, dated Aug. 1, 2012, 21 pages.
"Part 3: Carrier Sense Multiple Access with Collision Detection (CSMA/CD) Access Method and Physical Layer Specifications, Amendment 4: Media Access Control Parameters, Physical Layers, and Management Parameters for 40 Gb/s and 100 Gb/s Operation," IEEE Std 802.3ba, Jun. 22, 2010, 457 pages.
Foreign Communication From a Counterpart Application, European Application No. 14897751.5, Extended European Search Report dated Jun. 28, 2017, 5 pages.
Foreign Communication From a Counterpart Application, PCT Application No. PCT/CN2014/082171, English Translation of International Search Report dated Apr. 16, 2015, 2 pages.
Foreign Communication From a Counterpart Application, PCT Application No. PCT/CN2014/082171, English Translation of Written Opinion dated Apr. 16, 2015, 5 pages.

* cited by examiner

PACKET PROCESSING METHOD AND RELATED DEVICE THAT ARE APPLIED TO NETWORK DEVICE

CROSS-REFERENCE TO RELATED APPLICATIONS

This application is a continuation of International Patent Application No. PCT/CN2014/082171 filed on Jul. 14, 2014, which is hereby incorporated by reference in its entirety.

TECHNICAL FIELD

The present disclosure relates to the field of communications technologies, and in particular, to a packet processing method and a related apparatus that are applied to a network device.

BACKGROUND

A network device (for example, a gateway) bears a large quantity of end-to-end service flows. Based on a perspective of a service, a service flow is a consecutive bit in a sequence. However, based on a perspective of packet transmission, a service flow may be encapsulated into a packet (for example, an Internet Protocol (IP) packet) sequence, and each packet is independently transmitted in a network.

In a process of processing these packets, a data plane of the network device usually needs to perform classification processing on these packets according to service flows to which the packets belong, for example, during processing, packets of a same service flow need to be processed in order.

A single-instance classifier is deployed in a conventional network device, where the single-instance classifier distributes packets to multiple flow queues according to a receiving order, network service processing units concurrently process the packets in a unit of flow queue, and packets in a same flow queue are processed in serial order on a network service processing unit. However, it is difficult for the single-instance classifier in the conventional network device to implement a packet distribution capability of supporting high performance and a high rate.

SUMMARY

Embodiments of the present disclosure provide a packet processing method and a related device that are applied to a network device in order to improve a packet distribution processing capability of the network device.

The embodiments of the present disclosure provide the following technical solutions.

According to a first aspect, a packet processing method applied to a network device is provided, where K classifiers and S network service processing units are loaded into a memory of the network device, the K classifiers include a classifier x and a classifier y, and K and S are integers greater than 1. The method includes acquiring, by the classifier x, P packet identifiers from a queue area a that corresponds to the classifier x and is in a network adapter receiving queue, acquiring, by the classifier x and based on the P packet identifiers, P packets corresponding to the P packet identifiers, determining, by the classifier x and based on the P packets, flow queue identifiers corresponding to the P packets, distributing, by the classifier x, packet description information corresponding to the P packets to flow queues corresponding to the determined flow queue identifiers corresponding to the P packets, where packet description information corresponding to a packet i in the P packets is distributed to a flow queue corresponding to a determined flow queue identifier corresponding to the packet i, the packet i is any one packet in the P packets, and the packet description information corresponding to the packet i includes a packet identifier of the packet i, and processing, by $S_i$ network service processing units in the S network service processing units and based on the packet description information that corresponds to the P packets and is distributed to the flow queues, the P packets, and sending the P processed packets, and acquiring, by the classifier y, Q packet identifiers from a queue area b that corresponds to the classifier y and is in the network adapter receiving queue, acquiring, by the classifier y and based on the Q packet identifiers, Q packets corresponding to the Q packet identifiers, determining, by the classifier y and based on the Q packets, flow queue identifiers corresponding to the Q packets, distributing, by the classifier y after the classifier x distributes the packet description information corresponding to the P packets to the flow queues corresponding to the determined flow queue identifiers corresponding to the P packets, packet description information corresponding to the Q packets to flow queues corresponding to the determined flow queue identifiers corresponding to the Q packets, where packet description information corresponding to a packet m in the Q packet is distributed to a flow queue corresponding to a determined flow queue identifier corresponding to the packet m, the packet m is any one packet in the Q packets, the packet description information corresponding to the packet m includes a packet identifier of the packet m, Q and P are positive integers, and a time at which the Q packets are enqueued to the queue area b in the network adapter receiving queue is later than a time at which the P packets are enqueued to the queue area a in the network adapter receiving queue, and processing, by $S_j$ network service processing units in the S network service processing units and based on the packet description information that corresponds to the Q packets and is distributed to the flow queues, the Q packets, and sending the Q processed packets, where an intersection set between the $S_i$ network service processing units and the $S_j$ network service processing units is a null set or a non-null set.

With reference to the first aspect, in a first possible implementation manner of the first aspect, acquiring, by the classifier x, P packet identifiers from a queue area a that corresponds to the classifier x and is in a network adapter receiving queue includes acquiring, by the classifier x, the P packet identifiers from the queue area a corresponding to the classifier x after the classifier x finds, in a configuration table and based on a number of the classifier x, that a queue area that corresponds to the classifier x and is in the network adapter receiving queue is the queue area a, and acquiring, by the classifier y, Q packet identifiers from a queue area b that corresponds to the classifier y and is in the network adapter receiving queue includes acquiring, by the classifier y, the Q packet identifiers from the queue area b corresponding to the classifier y after the classifier y finds, in the configuration table and based on a number of the classifier y, that a queue area that corresponds to the classifier y and is in the network adapter receiving queue is the queue area b.

With reference to the first aspect or the first possible implementation manner of the first aspect, in a second possible implementation manner of the first aspect, determining, by the classifier x and based on the P packets, flow queue identifiers corresponding to the P packets includes parsing, by the classifier x, the P packets to acquire packet characteristic information included in the P packets, and performing, by the classifier x and based on the packet characteristic information included in the P packets, a table querying operation in order to obtain matching entries corresponding to the P packets, where the matching entries corresponding to the P packets include the flow queue identifiers corresponding to the P packets, and determining, by the classifier y and based on the Q packets, flow queue identifiers corresponding to the Q packets includes parsing, by the classifier y, the Q packets to acquire packet characteristic information included in the Q packets, and performing, by the classifier y and based on the acquired packet characteristic information included in the Q packets, a table querying operation in order to obtain matching entries corresponding to the Q packets, where the matching entries corresponding to the Q packets include the flow queue identifiers corresponding to the Q packets.

With reference to the second possible implementation manner of the first aspect, in a third possible implementation manner of the first aspect, the matching entries corresponding to the P packets further include flow identifiers of service flows to which the P packets belong, and the matching entries corresponding to the Q packets further include flow identifiers of service flows to which the Q packets belong.

With reference to the third possible implementation manner of the first aspect, in a fourth possible implementation manner of the first aspect, the packet description information corresponding to the packet i further includes a flow identifier of a service flow to which the packet i belongs, and processing, by $S_i$ network service processing units and based on the packet description information that corresponds to the P packets and is distributed to the flow queues, the P packets, and sending the P processed packets includes acquiring, by the $S_i$ network service processing units and based on the packet identifiers of the P packets, the P packets, where the packet identifiers of the P packets are included in the packet description information that corresponds to the P packets and is distributed to the flow queues, acquiring, by the $S_i$ network service processing units and based on the flow identifiers of the service flows to which the P packets belong, flow contexts of the service flows to which the P packets belong, where the flow identifiers of the service flows to which the P packets belong are included in the packet description information that corresponds to the P packets and is distributed to the flow queues, and processing, by the $S_i$ network service processing units and based on the acquired flow contexts of the service flows to which the P packets belong, the P acquired packets, and sending the P processed packets, and the packet description information corresponding to the packet m further includes a flow identifier of a service flow to which the packet m belongs, and processing, by $S_j$ network service processing units and based on the packet description information that corresponds to the Q packets and is distributed to the flow queues, the Q packets, and sending the Q processed packets includes acquiring, by the $S_j$ network service processing units and based on the packet identifiers of the Q packets, the Q packets, where the packet identifiers of the Q packets are included in the packet description information that corresponds to the Q packets and is distributed to the flow queues, acquiring, by the $S_j$ network service processing units and based on the flow identifiers of the service flows to which the Q packets belong, flow contexts of the service flows to which the Q packets belong, where the flow identifiers of the service flows to which the Q packets belong are included in the packet description information that corresponds to the Q packets and is distributed to the flow queues, and processing, by the $S_j$ network service processing units and based on the acquired flow contexts of the service flows to which the Q packets belong, the Q acquired packets, and sending the Q processed packets.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner of the first aspect, a waiting token is stored in the memory of the network device, where distributing, by the classifier x, packet description information corresponding to the P packets to flow queues identified by the determined flow queue identifiers corresponding to the P packets includes distributing, by the classifier x, the packet description information corresponding to the P packets to the flow queues identified by the determined flow queue identifiers corresponding to the P packets when the classifier x detects that the number of the classifier x matches a current first value of the waiting token, where the method further includes updating, by the classifier x, the current first value of the waiting token to a second value according to a preset policy, and distributing, by the classifier y after the classifier x distributes the packet description information corresponding to the P packets to the flow queues corresponding to the determined flow queue identifiers corresponding to the P packets, packet description information corresponding to the Q packets to flow queues corresponding to the determined flow queue identifiers corresponding to the Q packets includes distributing, by the classifier y, the packet description information corresponding to the Q packets to the flow queues identified by the determined flow queue identifiers corresponding to the Q packets when the classifier y detects that the number of the classifier y matches the current second value of the waiting token, where the method further includes updating, by the classifier y, the current second value of the waiting token according to the preset policy, where the second value is greater than the first value, or the second value is less than the first value.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, in a sixth possible implementation manner of the first aspect, the P packets further include a packet j, packet description information corresponding to the packet j is distributed to a flow queue corresponding to a determined flow queue identifier corresponding to the packet j, and the packet description information corresponding to the packet j includes a packet identifier of the packet j, a time at which the packet j is enqueued to the queue area a in the network adapter receiving queue is later than a time at which the packet i is enqueued to the queue area a in the network adapter receiving queue, a time at which the packet description information corresponding to the packet j is distributed to the flow queue corresponding to the determined flow queue identifier corresponding to the packet j is later than a time at which the packet description information corresponding to the packet i is distributed to the flow queue corresponding to the determined flow queue identifier corresponding to the packet i, and a time at which the $S_i$ network service processing units process, based on the packet description information that corresponds to the packet j and is distributed to the flow queue, the packet j is later than a time at which the $S_i$ network service processing units process, based on the packet description information that corresponds to the packet i and is distributed to the flow queue, the packet i, and the Q packets further include a packet n, packet description information corresponding to the packet n is distributed to a flow queue corresponding to a determined flow queue identifier corresponding to the packet n, and the packet description information corresponding to the packet n includes a packet identifier of the packet n, a time at which the packet n is enqueued to the queue area b in the network adapter receiving queue is later than a time at which the packet m is enqueued to the queue area b in the network adapter receiving queue, a time at which the packet description information corresponding to the packet n is distributed to the flow queue corresponding to the determined flow queue identifier corresponding to the packet n is later than a time at which the packet description information corresponding to the packet m is distributed to the flow queue corresponding to the determined flow queue identifier corresponding to the packet m, and a time at which the $S_j$ network service processing units process, based on the packet description information that corresponds to the packet n and is distributed to the flow queue, the packet n is later than a time at which the $S_j$ network service processing units process, based on the packet description information that corresponds to the packet m and is distributed to the flow queue, the packet m.

According to a second aspect, a packet processing apparatus applied to a network device is provided, where the apparatus includes K classifiers and S network service processing units, the K classifiers include a classifier x and a classifier y, and K and S are integers greater than 1, where the classifier x is configured to acquire P packet identifiers from a queue area a that corresponds to the classifier x and is in a network adapter receiving queue, acquire, based on the P packet identifiers, P packets corresponding to the P packet identifiers, determine, based on the P packets, flow queue identifiers corresponding to the P packets, and distribute packet description information corresponding to the P packets to flow queues corresponding to the determined flow queue identifiers corresponding to the P packets, where packet description information corresponding to a packet i in the P packets is distributed to a flow queue corresponding to a determined flow queue identifier corresponding to the packet i, the packet i is any one packet in the P packets, and the packet description information corresponding to the packet i includes a packet identifier of the packet i, $S_i$ network service processing units in the S network service processing units are configured to process, based on the packet description information that corresponds to the P packets and is distributed to the flow queues, the P packets, and send the P processed packets, the classifier y is configured to acquire Q packet identifiers from a queue area b that corresponds to the classifier y and is in the network adapter receiving queue, acquire, based on the Q packet identifiers, Q packets corresponding to the Q packet identifiers, determine, based on the Q packets, flow queue identifiers corresponding to the Q packets, and distribute, after the classifier x distributes the packet description information corresponding to the P packets to the flow queues corresponding to the determined flow queue identifiers corresponding to the P packets, packet description information corresponding to the Q packets to flow queues corresponding to the determined flow queue identifiers corresponding to the Q packets, where packet description information corresponding to a packet m in the Q packet is distributed to a flow queue corresponding to a determined flow queue identifier corresponding to the packet m, the packet m is any one packet in the Q packets, the packet description information corresponding to the packet m includes a packet identifier of the packet m, Q and P are positive integers, and a time at which the Q packets are enqueued to the queue area b in the network adapter receiving queue is later than a time at which the P packets are enqueued to the queue area a in the network adapter receiving queue, and $S_j$ network service processing units in the S network service processing units are configured to process, based on the packet description information that corresponds to the Q packets and is distributed to the flow queues, the Q packets, and send the Q processed packets, where an intersection set between the $S_i$ network service processing units and the $S_j$ network service processing units is a null set or a non-null set.

With reference to the second aspect, in a first possible implementation manner of the second aspect, in an aspect of acquiring the P packet identifiers from the queue area a that corresponds to the classifier x and is in the network adapter receiving queue, the classifier x is further configured to acquire, by the classifier x, the P packet identifiers from the queue area a corresponding to the classifier x after it is found, in a configuration table and based on a number of the classifier x, that a queue area that corresponds to the classifier x and is in the network adapter receiving queue is the queue area a, and in an aspect of acquiring the Q packet identifiers from the queue area b that corresponds to the classifier y and is in the network adapter receiving queue, the classifier y is further configured to acquire, by the classifier y, the Q packet identifiers from the queue area b corresponding to the classifier y after it is found, in the configuration table and based on a number of the classifier y, that a queue area that corresponds to the classifier y and is in the network adapter receiving queue is the queue area b.

With reference to the second aspect or the first possible implementation manner of the second aspect, in a second possible implementation manner of the second aspect, in an aspect of determining, based on the P packets, the flow queue identifiers corresponding to the P packets, the classifier x is further configured to parse the P packets to acquire packet characteristic information included in the P packets, and perform, based on the packet characteristic information included in the P packets, a table querying operation in order to obtain matching entries corresponding to the P packets, where the matching entries corresponding to the P packets include the flow queue identifiers corresponding to the P packets, and in an aspect of determining, based on the Q packets, the flow queue identifiers corresponding to the Q packets, the classifier y is further configured to parse the Q packets to acquire packet characteristic information included in the Q packets, and perform, based on the acquired packet characteristic information included in the Q packets, a table querying operation in order to obtain matching entries corresponding to the Q packets, where the matching entries corresponding to the Q packets include the flow queue identifiers corresponding to the Q packets.

With reference to the second possible implementation manner of the second aspect, in a third possible implementation manner of the second aspect, the matching entries corresponding to the P packets further include flow identifiers of service flows to which the P packets belong, and the matching entries corresponding to the Q packets further include flow identifiers of service flows to which the Q packets belong.

With reference to the third possible implementation manner of the second aspect, in a fourth possible implementation manner of the second aspect, the packet description information corresponding to the packet i further includes a flow identifier of a service flow to which the packet i belongs, and the $S_i$ network service processing units are further configured to acquire, based on the packet identifiers of the P packets, the P packets, where the packet identifiers of the P packets are included in the packet description information that corresponds to the P packets and is distributed to the flow queues, acquire, based on the flow identifiers of the service flows to which the P packets belong, flow contexts of the service flows to which the P packets belong, where the flow identifiers of the service flows to which the P packets belong are included in the packet description information that corresponds to the P packets and is distributed to the flow queues, and process, based on the acquired flow contexts of the service flows to which the P packets belong, the P acquired packets, and send the P processed packets, and the packet description information corresponding to the packet m further includes a flow identifier of a service flow to which the packet m belongs, and the $S_j$ network service processing units are further configured to acquire, based on the packet identifiers of the Q packets, the Q packets, where the packet identifiers of the Q packets are included in the packet description information that corresponds to the Q packets and is distributed to the flow queues, acquire, based on the flow identifiers of the service flows to which the Q packets belong, flow contexts of the service flows to which the Q packets belong, where the flow identifiers of the service flows to which the Q packets belong are included in the packet description information that corresponds to the Q packets and is distributed to the flow queues, and process, based on the acquired flow contexts of the service flows to which the Q packets belong, the Q acquired packets, and send the Q processed packets.

With reference to the second aspect, or the first possible implementation manner of the second aspect, or the second possible implementation manner of the second aspect, or the third possible implementation manner of the second aspect, or the fourth possible implementation manner of the second aspect, in a fifth possible implementation manner of the second aspect, in an aspect of distributing the packet description information corresponding to the P packets to the flow queues identified by the determined flow queue identifiers corresponding to the P packets, the classifier x is further configured to distribute the packet description information corresponding to the P packets to the flow queues identified by the determined flow queue identifiers corresponding to the P packets when it is detected that the number of the classifier x matches a current first value of a waiting token, where the classifier x is further configured to update the current first value of the waiting token to a second value according to a preset policy, and in an aspect in which the classifier y distributes, after the packet description information corresponding to the P packets is distributed to the flow queues corresponding to the determined flow queue identifiers corresponding to the P packets, the packet description information corresponding to the Q packets to the flow queues corresponding to the determined flow queue identifiers corresponding to the Q packets, the classifier y is further configured to distribute the packet description information corresponding to the Q packets to the flow queues identified by the determined flow queue identifiers corresponding to the Q packets when it is detected that the number of the classifier y matches the current second value of the waiting token, where the classifier y is further configured to update the current second value of the waiting token according to the preset policy, where the second value is greater than the first value, or the second value is less than the first value.

With reference to the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, in a sixth possible implementation manner of the second aspect, the P packets further include a packet j, packet description information corresponding to the packet j is distributed by the classifier x to a flow queue corresponding to a determined flow queue identifier corresponding to the packet j, and the packet description information corresponding to the packet j includes a packet identifier of the packet j, a time at which the packet j is enqueued to the queue area a in the network adapter receiving queue is later than a time at which the packet i is enqueued to the queue area a in the network adapter receiving queue, a time at which the packet description information corresponding to the packet j is distributed by the classifier x to the flow queue corresponding to the determined flow queue identifier corresponding to the packet j is later than a time at which the packet description information corresponding to the packet i is distributed by the classifier x to the flow queue corresponding to the determined flow queue identifier corresponding to the packet i, and a time at which the $S_i$ network service processing units process, based on the packet description information that corresponds to the packet j and is distributed to the flow queue, the packet j is later than a time at which the $S_i$ network service processing units process, based on the packet description information that corresponds to the packet i and is distributed to the flow queue, the packet i, and the Q packets further include a packet n, packet description information corresponding to the packet n is distributed by the classifier y to a flow queue corresponding to a determined flow queue identifier corresponding to the packet n, and the packet description information corresponding to the packet n includes a packet identifier of the packet n, a time at which the packet n is enqueued to the queue area b in the network adapter receiving queue is later than a time at which the packet m is enqueued to the queue area b in the network adapter receiving queue, a time at which the packet description information corresponding to the packet n is distributed by the classifier y to the flow queue corresponding to the determined flow queue identifier corresponding to the packet n is later than a time at which the packet description information corresponding to the packet m is distributed by the classifier y to the flow queue corresponding to the determined flow queue identifier corresponding to the packet m, and a time at which the $S_j$ network service processing units process, based on the packet description information that corresponds to the packet n and is distributed to the flow queue, the packet n is later than a time at which the $S_j$ network service processing units process, based on the packet description information that corresponds to the packet m and is distributed to the flow queue, the packet m.

According to a third aspect, a network device is provided, including a memory, and a processor connected to the memory, where the processor is configured to execute code or an instruction in the memory in order to load K classifiers and S network service processing units into the memory, where the K classifiers include a classifier x and a classifier y, and K and S are integers greater than 1, where the classifier x is configured to acquire P packet identifiers from a queue area a that corresponds to the classifier x and is in a network adapter receiving queue, acquire, based on the P packet identifiers, P packets corresponding to the P packet identifiers, determine, based on the P packets, flow queue identifiers corresponding to the P packets, and distribute packet description information corresponding to the P packets to flow queues corresponding to the determined flow queue identifiers corresponding to the P packets, where packet description information corresponding to a packet i in the P packets is distributed to a flow queue corresponding to a determined flow queue identifier corresponding to the packet i, the packet i is any one packet in the P packets, and the packet description information corresponding to the packet i includes a packet identifier of the packet i, $S_i$ network service processing units in the S network service processing units are configured to process, based on the packet description information that corresponds to the P packets and is distributed to the flow queues, the P packets, and send the P processed packets. The classifier y is configured to acquire Q packet identifiers from a queue area b that corresponds to the classifier y and is in the network adapter receiving queue, acquire, based on the Q packet identifiers, Q packets corresponding to the Q packet identifiers, determine, based on the Q packets, flow queue identifiers corresponding to the Q packets, and distribute, after the classifier x distributes the packet description information corresponding to the P packets to the flow queues corresponding to the determined flow queue identifiers corresponding to the P packets, packet description information corresponding to the Q packets to flow queues corresponding to the determined flow queue identifiers corresponding to the Q packets, where packet description information corresponding to a packet m in the Q packet is distributed to a flow queue corresponding to a determined flow queue identifier corresponding to the packet m, the packet m is any one packet in the Q packets, the packet description information corresponding to the packet m includes a packet identifier of the packet m, Q and P are positive integers, and a time at which the Q packets are enqueued to the queue area b in the network adapter receiving queue is later than a time at which the P packets are enqueued to the queue area a in the network adapter receiving queue, and $S_j$ network service processing units in the S network service processing units are configured to process, based on the packet description information that corresponds to the Q packets and is distributed to the flow queues, the Q packets, and send the Q processed packets, where an intersection set between the $S_i$ network service processing units and the $S_j$ network service processing units is a null set or a non-null set.

With reference to the third aspect, in a first possible implementation manner of the third aspect, in an aspect of acquiring the P packet identifiers from the queue area a that corresponds to the classifier x and is in the network adapter receiving queue, the classifier x is further configured to acquire, by the classifier x, the P packet identifiers from the queue area a corresponding to the classifier x after it is found, in a configuration table and based on a number of the classifier x, that a queue area that corresponds to the classifier x and is in the network adapter receiving queue is the queue area a, and in an aspect of acquiring the Q packet identifiers from the queue area b that corresponds to the classifier y and is in the network adapter receiving queue, the classifier y is further configured to acquire, by the classifier y, the Q packet identifiers from the queue area b corresponding to the classifier y after it is found, in the configuration table and based on a number of the classifier y, that a queue area that corresponds to the classifier y and is in the network adapter receiving queue is the queue area b.

With reference to the third aspect or the first possible implementation manner of the third aspect, in a second possible implementation manner of the third aspect, in an aspect of determining, based on the P packets, the flow queue identifiers corresponding to the P packets, the classifier x is further configured to parse the P packets to acquire packet characteristic information included in the P packets, and perform, based on the packet characteristic information included in the P packets, a table querying operation in order to obtain matching entries corresponding to the P packets, where the matching entries corresponding to the P packets include the flow queue identifiers corresponding to the P packets, and in an aspect of determining, based on the Q packets, the flow queue identifiers corresponding to the Q packets, the classifier y is further configured to parse the Q packets to acquire packet characteristic information included in the Q packets, and perform, based on the acquired packet characteristic information included in the Q packets, a table querying operation in order to obtain matching entries corresponding to the Q packets, where the matching entries corresponding to the Q packets include the flow queue identifiers corresponding to the Q packets.

With reference to the second possible implementation manner of the third aspect, in a third possible implementation manner of the third aspect, the matching entries corresponding to the P packets further include flow identifiers of service flows to which the P packets belong, and the matching entries corresponding to the Q packets further include flow identifiers of service flows to which the Q packets belong.

With reference to the third possible implementation manner of the third aspect, in a fourth possible implementation manner of the third aspect, the packet description information corresponding to the packet i further includes a flow identifier of a service flow to which the packet i belongs, and the $S_i$ network service processing units are further configured to acquire, based on the packet identifiers of the P packets, the P packets, where the packet identifiers of the P packets are included in the packet description information that corresponds to the P packets and is distributed to the flow queues, acquire, based on the flow identifiers of the service flows to which the P packets belong, flow contexts of the service flows to which the P packets belong, where the flow identifiers of the service flows to which the P packets belong are included in the packet description information that corresponds to the P packets and is distributed to the flow queues, and process, based on the acquired flow contexts of the service flows to which the P packets belong, the P acquired packets, and send the P processed packets, and the packet description information corresponding to the packet m further includes a flow identifier of a service flow to which the packet m belongs, and the $S_j$ network service processing units are further configured to acquire, based on the packet identifiers of the Q packets, the Q packets, where the packet identifiers of the Q packets are included in the packet description information that corresponds to the Q packets and is distributed to the flow queues, acquire, based on the flow identifiers of the service flows to which the Q packets belong, flow contexts of the service flows to which the Q packets belong, where the flow identifiers of the service flows to which the Q packets belong are included in the packet description information that corresponds to the Q packets and is distributed to the flow queues, and process, based on the acquired flow contexts of the service flows to which the Q packets belong, the Q acquired packets, and send the Q processed packets.

With reference to the third aspect, or the first possible implementation manner of the third aspect, or the second possible implementation manner of the third aspect, or the third possible implementation manner of the third aspect, or the fourth possible implementation manner of the third aspect, in a fifth possible implementation manner of the third aspect, in an aspect of distributing the packet description information corresponding to the P packets to the flow queues identified by the determined flow queue identifiers corresponding to the P packets, the classifier x is further configured to distribute the packet description information corresponding to the P packets to the flow queues identified by the determined flow queue identifiers corresponding to the P packets when it is detected that the number of the classifier x matches a current first value of a waiting token, where the classifier x is further configured to update the current first value of the waiting token to a second value according to a preset policy, and in an aspect in which the classifier y distributes, after the packet description information corresponding to the P packets is distributed to the flow queues corresponding to the determined flow queue identifiers corresponding to the P packets, the packet description information corresponding to the Q packets to the flow queues corresponding to the determined flow queue identifiers corresponding to the Q packets, the classifier y is further configured to distribute the packet description information corresponding to the Q packets to the flow queues identified by the determined flow queue identifiers corresponding to the Q packets when it is detected that the number of the classifier y matches the current second value of the waiting token, where the classifier y is further configured to update the current second value of the waiting token according to the preset policy, where the second value is greater than the first value, or the second value is less than the first value.

With reference to the third aspect, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, in a sixth possible implementation manner of the third aspect, the P packets further include a packet j, packet description information corresponding to the packet j is distributed by the classifier x to a flow queue corresponding to a determined flow queue identifier corresponding to the packet j, and the packet description information corresponding to the packet j includes a packet identifier of the packet j, a time at which the packet j is enqueued to the queue area a in the network adapter receiving queue is later than a time at which the packet i is enqueued to the queue area a in the network adapter receiving queue, a time at which the packet description information corresponding to the packet j is distributed by the classifier x to the flow queue corresponding to the determined flow queue identifier corresponding to the packet j is later than a time at which the packet description information corresponding to the packet i is distributed by the classifier x to the flow queue corresponding to the determined flow queue identifier corresponding to the packet i, and a time at which the $S_i$ network service processing units process, based on the packet description information that corresponds to the packet j and is distributed to the flow queue, the packet j is later than a time at which the $S_i$ network service processing units process, based on the packet description information that corresponds to the packet i and is distributed to the flow queue, the packet i, and the Q packets further include a packet n, packet description information corresponding to the packet n is distributed by the classifier y to a flow queue corresponding to a determined flow queue identifier corresponding to the packet n, and the packet description information corresponding to the packet n includes a packet identifier of the packet n, a time at which the packet n is enqueued to the queue area b in the network adapter receiving queue is later than a time at which the packet m is enqueued to the queue area b in the network adapter receiving queue, a time at which the packet description information corresponding to the packet n is distributed by the classifier y to the flow queue corresponding to the determined flow queue identifier corresponding to the packet n is later than a time at which the packet description information corresponding to the packet m is distributed by the classifier y to the flow queue corresponding to the determined flow queue identifier corresponding to the packet m, and a time at which the $S_j$ network service processing units process, based on the packet description information that corresponds to the packet n and is distributed to the flow queue, the packet n is later than a time at which the $S_j$ network service processing units process, based on the packet description information that corresponds to the packet m and is distributed to the flow queue, the packet m.

It can be learned that, in the embodiments of the present disclosure, K classifiers and S network service processing units are deployed in a network device, that is, multiple software-instance classifiers and S network service processing units are deployed. A single network adapter receiving queue is divided into multiple queue areas. Each classifier may acquire a packet identifier from a queue area that corresponds to the classifier and is in the network adapter receiving queue, that is, the network adapter receiving queue has multiple information reading interfaces such that the K classifiers may concurrently read packet identifiers from corresponding queue areas in the network adapter receiving queue, and the K classifiers may further concurrently determine, based on the packet identifiers acquired by the K classifiers, corresponding flow queue identifiers. Related operations before the K classifiers distribute packet description information to flow queues may all be understood as being concurrently executed, and concurrent execution makes processing times of the related operations become partially or completely overlapped, and required times and processing complexity of the related operations before the K classifiers distribute the packet description information to the flow queues are generally greater than a required time and processing complexity of an operation that the K classifiers distribute the packet description information to the flow queues. Therefore, multiple software-instance classifiers are introduced to the foregoing solutions in the embodiments, which helps to improve a packet distribution processing capability of a network device, and further helps to enable the network device to support a scenario of larger bandwidth.

In addition, a time at which the Q packets are enqueued to a queue area b in the network adapter receiving queue is later than a time at which the P packets are enqueued to a queue area a in the network adapter receiving queue. Therefore, the classifier y distributes, after the classifier x distributes packet description information corresponding to the P packets to flow queues corresponding to determined flow queue identifiers corresponding to the P packets, packet description information corresponding to the Q packets to flow queues corresponding to determined flow queue identifiers corresponding to the Q packets. The foregoing time sequence control helps to meet a sequence preserving requirement of packet distribution to some extent.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

Figure 1:
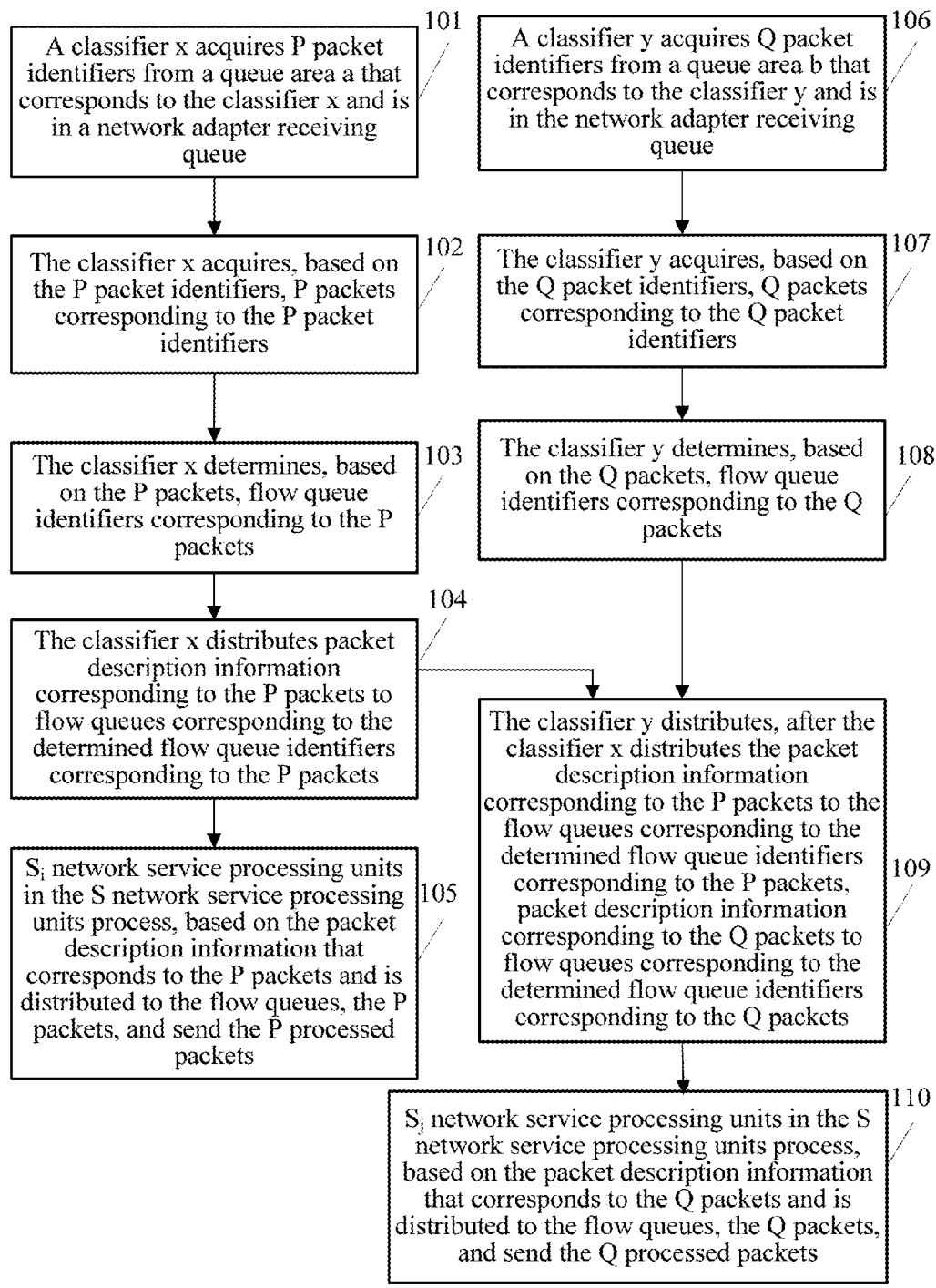
FIG. 1 is a schematic flowchart of a packet processing method applied to a network device according to an embodiment of the present disclosure.

Embodiments of the present disclosure provide a packet processing method and a related device that are applied to a network device in order to improve a packet distribution processing capability of the network device.

To make the disclosure objectives, features, and advantages of the present disclosure clearer and more comprehensible, the following describes the technical solutions in the embodiments of the present disclosure with reference to the accompanying drawings in the embodiments of the present disclosure. The embodiments described in the following are merely some but not all of the embodiments of the present disclosure. All other embodiments obtained by persons of ordinary skill in the art based on the embodiments of the present disclosure without creative efforts shall fall within the protection scope of the present disclosure.

In the specification, claims, and accompanying drawings of the present disclosure, the terms "first," "second," "third," "fourth," and so on are intended to distinguish different objects but are not intended to describe a specific sequence. In addition, the terms "include," "have," and any other variations thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the system, the product, or the device.

In one embodiment of a packet processing method applied to a network device according to the present disclosure, K classifiers and S network service processing units are loaded into a memory of the network device, the K classifiers include a classifier x and a classifier y, and K and S are integers greater than 1. The packet processing method applied to a network device may include acquiring, by the classifier x, P packet identifiers from a queue area a that corresponds to the classifier x and is in a network adapter receiving queue, acquiring, by the classifier x and based on the P packet identifiers, P packets corresponding to the P packet identifiers, determining, by the classifier x and based on the P packets, flow queue identifiers corresponding to the P packets, distributing, by the classifier x, packet description information corresponding to the P packets to flow queues corresponding to the determined flow queue identifiers corresponding to the P packets, where packet description information corresponding to a packet i in the P packets is distributed to a flow queue corresponding to a determined flow queue identifier corresponding to the packet i, the packet i is any one packet in the P packets, and the packet description information corresponding to the packet i includes a packet identifier of the packet i, processing, by $S_j$ network service processing units in the S network service processing units and based on the packet description information that corresponds to the P packets and is distributed to the flow queues, the P packets, and sending the P processed packets, acquiring, by the classifier y, Q packet identifiers from a queue area b that corresponds to the classifier y and is in the network adapter receiving queue, acquiring, by the classifier y and based on the Q packet identifiers, Q packets corresponding to the Q packet identifiers, determining, by the classifier y and based on the Q packets, flow queue identifiers corresponding to the Q packets, distributing, by the classifier y after the classifier x distributes the packet description information corresponding to the P packets to the flow queues corresponding to the determined flow queue identifiers corresponding to the P packets, packet description information corresponding to the Q packets to flow queues corresponding to the determined flow queue identifiers corresponding to the Q packets, where packet description information corresponding to a packet m in the Q packet is distributed to a flow queue corresponding to a determined flow queue identifier corresponding to the packet m, the packet m is any one packet in the Q packets, the packet description information corresponding to the packet m includes a packet identifier of the packet m, Q and P are positive integers, and a time at which the Q packets are enqueued to the queue area b in the network adapter receiving queue is later than a time at which the P packets are enqueued to the queue area a in the network adapter receiving queue, and processing, by $S_j$ network service processing units in the S network service processing units and based on the packet description information that corresponds to the Q packets and is distributed to the flow queues, the Q packets, and sending the Q processed packets, where an intersection set between the $S_i$ network service processing units and the $S_j$ network service processing units is a null set or a non-null set.

Referring to FIG. 1, FIG. 1 is a schematic flowchart of a packet processing method applied to a network device according to an embodiment of the present disclosure. K classifiers and S network service processing units are loaded into a memory of the network device, the K classifiers include a classifier x and a classifier y, and K and S are integers greater than 1. The packet processing method applied to a network device according to an embodiment of the present disclosure may include the following steps.

Step 101: The classifier x acquires P packet identifiers from a queue area a that corresponds to the classifier x and is in a network adapter receiving queue.

A packet identifier may be a packet address or another packet identifier that can identify a packet. For example, the foregoing P packet identifiers may be packet addresses or packet numbers of the P packets, or other packet identifiers that can identify the P packets.

Step 102: The classifier x acquires, based on the P packet identifiers, P packets corresponding to the P packet identifiers.

Step 103: The classifier x determines, based on the P packets, flow queue identifiers corresponding to the P packets.

Step 104: The classifier x distributes packet description information corresponding to the P packets to flow queues corresponding to the determined flow queue identifiers corresponding to the P packets.

Packet description information corresponding to a packet i in the P packets is distributed to a flow queue corresponding to a determined flow queue identifier corresponding to the packet i, the packet i is any one packet in the P packets, and the packet description information corresponding to the packet i includes a packet identifier of the packet i.

Step 105: $S_i$ network service processing units in the S network service processing units process, based on the packet description information that corresponds to the P packets and is distributed to the flow queues, the P packets, and send the P processed packets.

That the $S_i$ network service processing units in the S network service processing units process, based on the packet description information that corresponds to the P packets and is distributed to the flow queues, the P packets, and send the P processed packets, for example, may include that the $S_i$ network service processing units acquire, based on the packet identifiers of the P packets, the P packets, where the packet identifiers of the P packets are included in the packet description information that corresponds to the P packets and is distributed to the flow queues, and the $S_i$ network service processing units process the P acquired packets, and send the P processed packets. A network service processing unit in the $S_i$ network service processing units may acquire, based on the packet identifier of the packet i, the packet i, where the packet identifier of the packet i is included in the packet description information that corresponds to the packet i and is distributed to the flow queue, process the acquired packet i and send the processed packet i. Processing performed by the network service processing unit on the packet i may further be encryption/decryption of content of the packet i, modification of a packet header of the packet i, or the like.

Step 106: The classifier y acquires Q packet identifiers from a queue area b that corresponds to the classifier y and is in the network adapter receiving queue.

The foregoing Q packet identifiers may be packet addresses or packet numbers of the Q packets, or other packet identifiers that can identify the Q packets.

Step 107: The classifier y acquires, based on the Q packet identifiers, Q packets corresponding to the Q packet identifiers.

Step 108: The classifier y determines, based on the Q packets, flow queue identifiers corresponding to the Q packets.

Step 109: The classifier y distributes, after the classifier x distributes the packet description information corresponding to the P packets to the flow queues corresponding to the determined flow queue identifiers corresponding to the P packets, packet description information corresponding to the Q packets to flow queues corresponding to the determined flow queue identifiers corresponding to the Q packets.

Packet description information corresponding to a packet m in the Q packet is distributed to a flow queue corresponding to a determined flow queue identifier corresponding to the packet m, the packet m is any one packet in the Q packets, and the packet description information corresponding to the packet m includes a packet identifier of the packet m. Q and P are positive integers. A time at which the Q packets are enqueued to the queue area b in the network adapter receiving queue is later than a time at which the P packets are enqueued to the queue area a in the network adapter receiving queue.

It may be understood that the time at which the Q packets are enqueued to the queue area b in the network adapter receiving queue may further refer to a time at which the Q packets are written into memory space to which a memory address recorded in the queue area b in the network adapter receiving queue points. Similarly, the time at which the P packets are enqueued to the queue area a in the network adapter receiving queue may further refer to a time at which the P packets are written into memory space to which a memory address recorded in the queue area a in the network adapter receiving queue points.

Step 110: $S_j$ network service processing units in the S network service processing units process, based on the packet description information that corresponds to the Q packets and is distributed to the flow queues, the Q packets, and send the Q processed packets.

That the $S_j$ network service processing units in the S network service processing units process, based on the packet description information that corresponds to the Q packets and is distributed to the flow queues, the Q packets and send the Q processed packets, for example, may include that the $S_j$ network service processing units acquire, based on the packet identifiers of the Q packets, the Q packets, where the packet identifiers of the Q packets are included in the packet description information that corresponds to the Q packets and is distributed to the flow queues, and the $S_j$ network service processing units process the Q acquired packets, and send the Q processed packets. A network service processing unit in the $S_j$ network service processing units may acquire, based on the packet identifier of the packet m, the packet m, where the packet identifier of the packet m is included in the packet description information that corresponds to the packet m and is distributed to the flow queue, process the acquired packet m and send the processed packet m. Processing performed by the network service processing unit on the packet m may be encryption/ decryption of content of the packet m, modification of a packet header of the packet m, or the like.

An intersection set between the $S_i$ network service processing units and the $S_j$ network service processing units is a null set or a non-null set, that is, network service processing units included in the $S_i$ network service processing units and network service processing units included in the $S_j$ network service processing units may be partially the same, completely the same, or completely different. For example, the $S_i$ network service processing units include a network service processing unit C1, a network service processing unit C2, and a network service processing unit C3, and the $S_j$ network service processing units may include the network service processing unit C1, the network service processing unit C2, and the network service processing unit C3, that is, the network service processing units included in the $S_i$ network service processing units are completely the same as the network service processing units included in the $S_j$ network service processing units. For another example, the $S_i$ network service processing units include a network service processing unit C1, a network service processing unit C2, and a network service processing unit C3, and the $S_j$ network service processing units may include the network service processing unit C2, the network service processing unit C3, and a network service processing unit C4, that is, the network service processing units included in the $S_i$ network service processing units are partially the same as the network service processing units included in the $S_j$ network service processing units. For another example, the $S_i$ network service processing units include a network service processing unit C1, a network service processing unit C2, and a network service processing unit C3, and the $S_j$ network service processing units may include a network service processing unit C5, a network service processing unit C6, and a network service processing unit C4, that is, the network service processing units included in the $S_i$ network service processing units are completely different from the network service processing units included in the $S_j$ network service processing units.

The network device in this embodiment of the present disclosure may be a serving gateway, or a packet data network gateway (PGW), or a gateway of another type, or a data-plane convergence node of another type in a communications network. The network device may receive massive packets when the network device is a data-plane convergence node, and in this scenario, the network device needs to have an extremely strong packet distribution capability to meet a high-performance requirement.

It may be understood that the K classifiers that are loaded into the memory of the network device are K software-instance classifiers, and the S network service processing units that are loaded into the memory of the network device are S software-instance network service processing units. That is, in the technical solution in this embodiment of the present disclosure, multiple software-instance classifiers are deployed in the network device, and the multiple software-instance classifiers may concurrently run in most cases, and multiple software-instance network service processing units are deployed in the network device, and the multiple software-instance network service processing units may concurrently run.

For example, the step that the classifier x acquires the P packet identifiers from the queue area a that corresponds to the classifier x and is in the network adapter receiving queue may be concurrently executed with the step that the classifier y acquires the Q packet identifiers from the queue area b that corresponds to the classifier y and is in the network adapter receiving queue. The step that the classifier x acquires, based on the P packet identifiers, the P packets corresponding to the P packet identifiers may be concurrently executed with the step that the classifier y acquires, based on the Q packet identifiers, the Q packets corresponding to the Q packet identifiers. The step that the classifier x determines, based on the P packets, the flow queue identifiers corresponding to the P packets may be concurrently executed with the step that the classifier y determines, based on the Q packets, the flow queue identifiers corresponding to the Q packets.

It can be learned that, in the solution in this embodiment, K classifiers and S network service processing units are deployed in a network device, that is, multiple software-instance classifiers and S network service processing units are deployed. A network adapter receiving queue is divided into multiple queue areas. Each classifier may acquire a packet identifier from a queue area that corresponds to the classifier and is in the network adapter receiving queue, that is, the network adapter receiving queue has multiple information reading interfaces such that the K classifiers may concurrently read packet identifiers from corresponding queue areas in the network adapter receiving queue, and the K classifiers may further concurrently determine, based on the packet identifiers acquired by the K classifiers, corresponding flow queue identifiers, related operations before the K classifiers distribute packet description information to flow queues may all be concurrently executed, and concurrent execution makes processing times of the related operations become partially or completely overlapped, and required times and processing complexity of the related operations before the K classifiers distribute the packet description information to the flow queues are generally greater than a required time and processing complexity of an operation that the K classifiers distribute the packet description information to the flow queues. Therefore, multiple software-instance classifiers are introduced to the foregoing solution in this embodiment, which helps to improve a packet distribution processing capability of a network device, and further helps to enable the network device to support a scenario of larger bandwidth.

In addition, a time at which the Q packets are enqueued to a queue area b in the network adapter receiving queue is later than a time at which the P packets are enqueued to a queue area a in the network adapter receiving queue. Therefore, the classifier y distributes, after the classifier x distributes packet description information corresponding to the P packets to flow queues corresponding to determined flow queue identifiers corresponding to the P packets, packet description information corresponding to the Q packets to flow queues corresponding to determined flow queue identifiers corresponding to the Q packets. The foregoing time sequence control helps to meet a sequence preserving requirement of packet distribution to some extent.

Optionally, in some possible implementation manners of the present disclosure, that the classifier x acquires the P packet identifiers from the queue area a that corresponds to the classifier x and is in the network adapter receiving queue includes that after the classifier x finds, in a configuration table and based on a number of the classifier x, that a queue area that corresponds to the classifier x and is in the network adapter receiving queue is the queue area a, the classifier x acquires the P packet identifiers from the queue area a corresponding to the classifier x. A mapping relationship between a queue area and a classifier may be recorded in the configuration table, and it may be understood that the network adapter receiving queue may include K queue areas, where the K queue areas and the K classifiers correspond to each other in a one-to-one manner. A possible configuration table may be shown in FIG. 2A, and in the configuration table shown in FIG. 2A, a mapping relationship between a queue area and a classifier is recorded by recording a mapping relationship between a number of the queue area and a number of the classifier. Therefore, for example, the classifier x may find, in the configuration table and based on the number of the classifier x, the queue area (which is the queue area a herein) that corresponds to the classifier x and is in the network adapter receiving queue. Alternatively, the classifier x may perform, using the number of the classifier x as a variable, a set function operation in order to obtain a queue area number of the queue area corresponds to the classifier x and is in the network adapter receiving queue. Alternatively, the classifier x may determine, in another manner, the queue area corresponds to the classifier x and is in the network adapter receiving queue.

Optionally, in some possible implementation manners of the present disclosure, that the classifier y acquires the Q packet identifiers from the queue area b that corresponds to the classifier y and is in the network adapter receiving queue may include that after the classifier y finds, in the configuration table and based on a number of the classifier y, that a queue area that corresponds to the classifier y and is in the network adapter receiving queue is the queue area b, the classifier y acquires the Q packet identifiers from the queue area b corresponding to the classifier y. Alternatively, the classifier y may perform, using the number of the classifier y as a variable, a set function operation in order to obtain a queue area number of the queue area that corresponds to the classifier y and is in the network adapter receiving queue. Alternatively, the classifier y may determine, in another manner, the queue area that corresponds to the classifier y and is in the network adapter receiving queue.

Figures 2A, 2B:
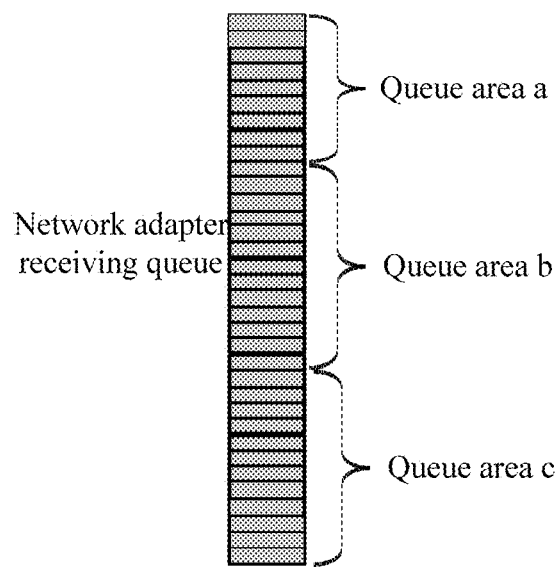
FIG. 2A is a schematic diagram of a configuration table for recording a mapping relationship between a number of a queue area and a number of a classifier according to an embodiment of the present disclosure.
FIG. 2B is a schematic diagram of queue area division of a network adapter queue according to an embodiment of the present disclosure.
Figure 2C:
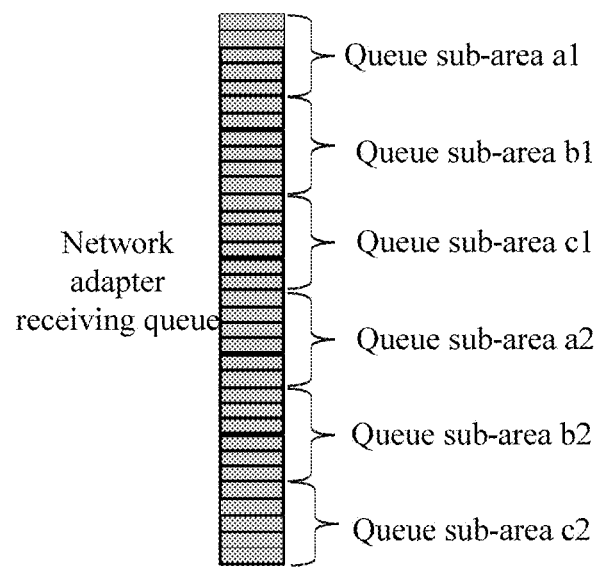
FIG. 2C is a schematic diagram of queue area division of another network adapter queue according to an embodiment of the present disclosure.

It may be understood that member numbers of queue members in a queue area corresponding to a classifier may be adjacent, or a queue area corresponding to a classifier may include multiple queue sub-areas, where member numbers of queue members in different queue sub-areas of the multiple queue sub-areas are not adjacent, and member numbers of queue members in each queue sub-area are adjacent. For example, as shown in FIG. 2B and FIG. 2C, FIG. 2B exemplarily shows that member numbers of queue members in the queue area corresponding to the classifier x are adjacent, and so on. FIG. 2C exemplarily shows that the queue area corresponding to the classifier x may include multiple queue sub-areas, where member numbers of queue members in different queue sub-areas of the multiple queue sub-areas are not adjacent, and member numbers of queue members in each queue sub-area are adjacent. FIG. 2C exemplarily shows that the queue area a corresponding to the classifier x includes a queue area a1 and a queue area a2, the queue area b corresponding to the classifier y includes a queue area b1 and a queue area b2, a queue area c includes a queue area c1 and a queue area c2, and so on.

Optionally, in some possible implementation manners of the present disclosure, the P packets further include a packet j, where packet description information corresponding to the packet j is distributed to a flow queue corresponding to a determined flow queue identifier corresponding to the packet j. The packet description information corresponding to the packet j may include a packet identifier of the packet j, and the packet description information corresponding to the packet j may further include length information of the packet j. A time at which the packet j is enqueued to the queue area a in the network adapter receiving queue is later than a time at which the packet i is enqueued to the queue area a in the network adapter receiving queue, and a time at which the packet description information corresponding to the packet j is distributed to the flow queue corresponding to the determined flow queue identifier corresponding to the packet j is later than a time at which the packet description information corresponding to the packet i is distributed to the flow queue corresponding to the determined flow queue identifier corresponding to the packet i. That is, earlier a packet is enqueued to the queue area a in the network adapter receiving queue, earlier the classifier x distributes packet description information corresponding to the packet to a flow queue corresponding to a determined flow queue identifier corresponding to the packet, and later a packet is enqueued to the queue area a in the network adapter receiving queue, later the classifier x distributes packet description information corresponding to the packet to a flow queue corresponding to a determined flow queue identifier corresponding to the packet. A time at which the $S_i$ network service processing units process, based on the packet description information that corresponds to the packet j and is distributed to the flow queue, the packet j is later than a time at which the $S_i$ network service processing units process, based on the packet description information that corresponds to the packet i and is distributed to the flow queue, the packet i. For example, if the packet i and the packet j belong to a same service flow (when the packet i and the packet j belong to a same service flow, the packet description information corresponding to the packet i and the packet description information corresponding to the packet j are distributed by the classifier x to a same flow queue), the time at which the $S_i$ network service processing units process, based on the packet description information that corresponds to the packet j and is distributed to the flow queue, the packet j is later than the time at which the $S_i$ network service processing units process, based on the packet description information that corresponds to the packet i and is distributed to the flow queue, the packet i. The foregoing time sequence control helps to further meet a sequence preserving requirement of packet distribution.

Optionally, in some possible implementation manners of the present disclosure, the Q packets further include a packet n, where packet description information corresponding to the packet n is distributed to a flow queue corresponding to a determined flow queue identifier corresponding to the packet n. The packet description information corresponding to the packet n includes a packet identifier of the packet n, and the packet description information corresponding to the packet n may further include length information of the packet n. A time at which the packet n is enqueued to the queue area b in the network adapter receiving queue is later than a time at which the packet m is enqueued to the queue area b in the network adapter receiving queue, and a time at which the packet description information corresponding to the packet n is distributed to the flow queue corresponding to the determined flow queue identifier corresponding to the packet n is later than a time at which the packet description information corresponding to the packet m is distributed to the flow queue corresponding to the determined flow queue identifier corresponding to the packet m. That is, earlier a packet is enqueued to the queue area b in the network adapter receiving queue, earlier the classifier y distributes packet description information corresponding to the packet to a flow queue corresponding to a determined flow queue identifier corresponding to the packet, and later a packet is enqueued to the queue area b in the network adapter receiving queue, later the classifier y distributes packet description information corresponding to the packet to a flow queue corresponding to a determined flow queue identifier corresponding to the packet. A time at which the $S_j$ network service processing units process, based on the packet description information that corresponds to the packet n and is distributed to the flow queue, the packet n is later than a time at which the $S_j$ network service processing units process, based on the packet description information that corresponds to the packet m and is distributed to the flow queue, the packet m. For example, if the packet m and the packet n belong to a same service flow (when the packet m and the packet n belong to a same service flow, the packet description information corresponding to the packet n and the packet description information corresponding to the packet m are distributed by the classifier y to a same flow queue), the time at which the $S_j$ network service processing units process, based on the packet description information that corresponds to the packet n and is distributed to the flow queue, the packet n is later than the time at which the $S_j$ network service processing units process, based on the packet description information that corresponds to the packet m and is distributed to the flow queue, the packet m. The foregoing time sequence control helps to further meet a sequence preserving requirement of packet distribution.

Optionally, in some possible implementation manners of the present disclosure, that the classifier x determines, based on the P packets, the flow queue identifiers corresponding to the P packets may include that the classifier x parses the P packets to acquire packet characteristic information included in the P packets, and the classifier x performs, based on the packet characteristic information included in the P packets, a table querying operation in order to obtain matching entries corresponding to the P packets, where the matching entries corresponding to the P packets include the flow queue identifiers corresponding to the P packets. Acquired packet characteristic information included in the packet i in the P packets may be, for example, a value or values of one or more fields in a packet header of the packet i. If the P packets further include the packet j, acquired packet characteristic information included in the packet j in the P packets may be, for example, a value or values of one or more fields in a packet header of the packet j. Further, the matching entries corresponding to the P packets may further include flow identifiers of service flows to which the P packets belong. For example, a matching entry corresponding to the packet i may include the flow queue identifier corresponding to the packet i. The matching entry corresponding to the packet i may further include a flow identifier of a service flow to which the packet i belongs, and certainly, may further include other information. For example, a matching entry corresponding to the packet j may include the flow queue identifier corresponding to the packet j. The matching entry corresponding to the packet j may further include a flow identifier of a service flow to which the packet j belongs, and certainly, may further include other information.

That the classifier x performs, based on the packet characteristic information included in the P packets, a table querying operation in order to obtain the matching entries corresponding to the P packets may include that the classifier x performs a table querying operation using the packet characteristic information included in the P packets as table querying key values in order to obtain the matching entries corresponding to the P packets, or the classifier x obtains, based on the packet characteristic information included in the P packets, table querying key values corresponding to the P packets, and the classifier x performs, based on the table querying key values corresponding to the P packets, a table querying operation in order to obtain the matching entries corresponding to the P packets. For example, the classifier x performs a table querying operation using the packet characteristic information included in the packet i as a table querying key value in order to obtain the matching entry corresponding to the packet i, or the classifier x obtains, based on the packet characteristic information included in the packet i, a table querying key value corresponding to the packet i (the table querying key value corresponding to the packet i may be obtained after a table querying operation or a function operation is performed using the packet characteristic information included in the packet i), and the classifier x performs, based on the table querying key value corresponding to the packet i, a table querying operation in order to obtain the matching entry corresponding to the packet i. For another example, the classifier x performs a table querying operation using the packet characteristic information included in the packet j as a table querying key value in order to obtain the matching entry corresponding to the packet j, or the classifier x obtains, based on the packet characteristic information included in the packet j, a table querying key value corresponding to the packet j (the table querying key value corresponding to the packet j may be obtained after a table querying operation or a function operation is performed using the packet characteristic information included in the packet j), and the classifier x performs, based on the table querying key value corresponding to the packet j, a table querying operation in order to obtain the matching entry corresponding to the packet j.

The table querying key values corresponding to the P packets may be obtained after a table querying operation and/or a function operation is performed using the packet characteristic information included in the P packets. For example, the table querying key values corresponding to the P packets may be the flow identifiers of the service flows to which the P packets belong. Further, for example, the table querying key value corresponding to the packet i may be obtained after a table querying operation and/or a function operation is performed using the packet characteristic information included in the packet i. For example, the table querying key value corresponding to the packet i may be the flow identifier of the service flow to which the packet i belongs, where the flow identifier is obtained by performing, based on the packet characteristic information of the packet i, a table querying operation. For another example, the table querying key value corresponding to the packet j may be obtained after a table querying operation and/or a function operation is performed using the packet characteristic information included in the packet j. For example, the table querying key value corresponding to the packet j may be the flow identifier of the service flow to which the packet j belongs, where the flow identifier is obtained by performing, based on the packet characteristic information of the packet j, a table querying operation.

Optionally, in some possible implementation manners of the present disclosure, that the classifier y determines, based on the Q packets, the flow queue identifiers corresponding to the Q packets may include that the classifier y parses the Q packets to acquire packet characteristic information included in the Q packets, and the classifier y performs, based on the acquired packet characteristic information included in the Q packets, a table querying operation in order to obtain matching entries corresponding to the Q packets, where the matching entries corresponding to the Q packets include the flow queue identifiers corresponding to the Q packets. Acquired packet characteristic information included in the packet m in the Q packets may be, for example, a value or values of one or more fields in a packet header of the packet m. If the Q packets further include the packet n, acquired packet characteristic information included in the packet n in the Q packets may be, for example, a value or values of one or more fields in a packet header of the packet n. The matching entries corresponding to the Q packets may further include flow identifiers of service flows to which the Q packets belong. For example, a matching entry corresponding to the packet m may include the flow queue identifier corresponding to the packet m. The matching entry corresponding to the packet m may further include a flow identifier of a service flow to which the packet m belongs, and certainly, may further include other information. For example, a matching entry corresponding to the packet n may include the flow queue identifier corresponding to the packet n. The matching entry corresponding to the packet n may further include a flow identifier of a service flow to which the packet n belongs, and certainly, may further include other information.

That the classifier y performs, based on the packet characteristic information included in the Q packets, a table querying operation in order to obtain the matching entries corresponding to the Q packets may include that the classifier y performs, a table querying operation using the packet characteristic information included in the Q packets as table querying key values in order to obtain the matching entries corresponding to the Q packets, or the classifier y obtains, based on the packet characteristic information included in the Q packets, table querying key values corresponding to the Q packets, and the classifier y performs, based on the table querying key values corresponding to the Q packets, a table querying operation in order to obtain the matching entries corresponding to the Q packets. For example, the classifier y performs a table querying operation using the packet characteristic information included in the packet m as a table querying key value in order to obtain the matching entry corresponding to the packet m, or the classifier y may obtain, based on the packet characteristic information included in the packet m, a table querying key value corresponding to the packet m (the table querying key value corresponding to the packet m may be obtained after a table querying operation or a function operation is performed using the packet characteristic information included in the packet m), and the classifier y performs, based on the table querying key value corresponding to the packet m, a table querying operation in order to obtain the matching entry corresponding to the packet m. For another example, the classifier y performs a table querying operation using the packet characteristic information included in the packet n as a table querying key value in order to obtain the matching entry corresponding to the packet n, or the classifier y obtains, based on the packet characteristic information included in the packet n, a table querying key value corresponding to the packet n (the table querying key value corresponding to the packet n may be obtained after a table querying operation or a function operation is performed using the packet characteristic information included in the packet n), and the classifier y performs, based on the table querying key value corresponding to the packet n, a table querying operation in order to obtain the matching entry corresponding to the packet n.

The table querying key values corresponding to the Q packets may be obtained after a table querying operation and/or a function operation is performed using the packet characteristic information included in the Q packets. For example, the table querying key values corresponding to the Q packets may be the flow identifiers of the service flows to which the P packets belong. Further, for example, the table querying key value corresponding to the packet m may be obtained after a table querying operation and/or a function operation is performed using the packet characteristic information included in the packet m. For example, the table querying key value corresponding to the packet m may be the flow identifier of the service flow to which the packet m belongs, where the flow identifier is obtained by performing, based on the packet characteristic information of the packet m, a table querying operation. Further, for another example, the table querying key value corresponding to the packet n may be obtained after a table querying operation and/or a function operation is performed using the packet characteristic information included in the packet n. For example, the table querying key value corresponding to the packet n may be the flow identifier of the service flow to which the packet n belongs, where the flow identifier is obtained by performing, based on the packet characteristic information of the packet n, a table querying operation.

Optionally, in some possible implementation manners of the present disclosure, the packet description information corresponding to the packet i further includes the flow identifier of the service flow to which the packet i belongs, that is, the packet description information corresponding to the P packets further includes the flow identifiers of the service flows to which the P packets belong. That the $S_i$ network service processing units process, based on the packet description information that corresponds to the P packets and is distributed to the flow queues, the P packets, and send the P processed packets may include that the $S_i$ network service processing units acquire, based on the packet identifiers of the P packets, the P packets, where the packet identifiers of the P packets are included in the packet description information that corresponds to the P packets and is distributed to the flow queues. The $S_i$ network service processing units acquire, based on the flow identifiers of the service flows to which the P packets belong, flow contexts of the service flows to which the P packets belong, where the flow identifiers of the service flows to which the P packets belong are included in the packet description information that corresponds to the P packets and is distributed to the flow queues, and the $S_i$ network service processing units process, based on the acquired flow contexts of the service flows to which the P packets belong, the P acquired packets, and send the P processed packets. A network service processing unit in the $S_i$ network service processing units may acquire, based on the packet identifier of the packet i, the packet i, where the packet identifier of the packet i is included in the packet description information that corresponds to the packet i and is distributed to the flow queue, acquires, based on the flow identifier of the service flow to which the packet i belongs, a flow context of the service flow to which the packet i belongs, where the flow identifier of the service flow to which the packet i belongs is included in the packet description information that corresponds to the packet i and is distributed to the flow queue, and processes, based on the acquired flow context of the service flow to which the packet i belongs, the acquired packet i, and sends the processed packet i. A network service processing unit in the $S_i$ network service processing units may acquire, based on the packet identifier of the packet j, the packet j, where the packet identifier of the packet j is included in the packet description information that corresponds to the packet j and is distributed to the flow queue, may acquire, based on the flow identifier of the service flow to which the packet j belongs, a flow context of the service flow to which the packet j belongs, where the flow identifier of the service flow to which the packet j belongs is included in the packet description information that corresponds to the packet j and is distributed to the flow queue, and processes, based on the acquired flow context of the service flow to which the packet j belongs, the acquired packet j, and sends the processed packet j.

Optionally, in some possible implementation manners of the present disclosure, the packet description information corresponding to the packet m further includes the flow identifier of the service flow to which the packet m belongs, that is, the packet description information corresponding to the Q packets further includes the flow identifiers of the service flows to which the Q packets belong. That the $S_j$ network service processing units process, based on the packet description information that corresponds to the Q packets and is distributed to the flow queues, the Q packets, and send the Q processed packets may include that the $S_j$ network service processing units acquire, based on the packet identifiers of the Q packets, the Q packets, where the packet identifiers of the Q packets are included in the packet description information that corresponds to the Q packets and is distributed to the flow queues. The $S_j$ network service processing units acquire, based on the flow identifiers of the service flows to which the Q packets belong, flow contexts of the service flows to which the Q packets belong, where the flow identifiers of the service flows to which the Q packets belong are included in the packet description information that corresponds to the Q packets and is distributed to the flow queues, and the $S_j$ network service processing units process, based on the acquired flow contexts of the service flows to which the Q packets belong, the Q acquired packets, and send the Q processed packets. A network service processing unit in the $S_j$ network service processing units may acquire, based on the packet identifier of the packet m, the packet m, where the packet identifier of the packet m is included in the packet description information that corresponds to the packet m and is distributed to the flow queue, acquires, based on the flow identifier of the service flow to which the packet m belongs, a flow context of the service flow to which the packet m belongs, where the flow identifier of the service flow to which the packet m belongs is included in the packet description information that corresponds to the packet m and is distributed to the flow queue, and processes, based on the acquired flow context of the service flow to which the packet m belongs, the acquired packet m, and sends the processed packet m. A network service processing unit in the $S_j$ network service processing units may acquire, based on the packet identifier of the packet n, the packet n, where the packet identifier of the packet n is included in the packet description information that corresponds to the packet n and is distributed to the flow queue, may acquire, based on the flow identifier of the service flow to which the packet n belongs, a flow context of the service flow to which the packet n belongs, where the flow identifier of the service flow to which the packet n belongs is included in the packet description information that corresponds to the packet n and is distributed to the flow queue, and may process, based on the acquired flow context of the service flow to which the packet n belongs, the acquired packet n, and send the processed packet n.

A flow context of a service flow may include session status information of the service flow, and may further include information such as a statistical quantity of packets in the service flow. For example, the flow context of the service flow to which the packet m belongs may include session status information of the service flow to which the packet m belongs, and may further include information such as a statistical quantity of packets in the service flow to which the packet m belongs. For another example, the flow context of the service flow to which the packet i belongs may include session status information of the service flow to which the packet i belongs, and may further include information such as a statistical quantity of packets in the service flow to which the packet i belongs.

Optionally, in some possible implementation manners of the present disclosure, the memory of the network device may store a waiting token. That the classifier x distributes the packet description information corresponding to the P packets to the flow queues identified by the determined flow queue identifiers corresponding to the P packets may include that the classifier x distributes the packet description information corresponding to the P packets to the flow queues identified by the determined flow queue identifiers corresponding to the P packets when the classifier x detects that the number of the classifier x matches a current first value of the waiting token (that the number of the classifier x matches the current first value of the waiting token may indicate, for example, that the number of the classifier x is the same as the current first value of the waiting token, or may indicate that a difference between the number of the classifier x and the current first value of the waiting token is a first set value, or may indicate that a remainder obtained after the current first value of the waiting token is divided by K is equal to the number of the classifier x, or may indicate that a difference between the number of the classifier x and a remainder obtained after the current first value of the waiting token is divided by K is a second set value), where the method further includes that the classifier x updates the current first value of the waiting token to a second value according to a preset policy. That the classifier x updates the current first value of the waiting token to the second value according to the preset policy may include that the classifier x may update the current first value of the waiting token to the second value by adding 1 to the current first value of the waiting token. If the waiting token has a maximum value and a minimum value and the current first value of the waiting token is the maximum value of the waiting token, the second value obtained by updating the current first value of the waiting token by the classifier x is the minimum value of the waiting token.

That the classifier y distributes, after the classifier x distributes the packet description information corresponding to the P packets to the flow queues corresponding to the determined flow queue identifiers corresponding to the P packets, the packet description information corresponding to the Q packets to the flow queues corresponding to the determined flow queue identifiers corresponding to the Q packets includes that the classifier y distributes the packet description information corresponding to the Q packets to the flow queues identified by the determined flow queue identifiers corresponding to the Q packets when the classifier y detects that the number of the classifier y matches the current second value of the waiting token (that the number of the classifier y matches the current second value of the waiting token may indicate, for example, that the number of the classifier y is the same as the current second value of the waiting token, or may indicate that a difference between the number of the classifier y and the current second value of the waiting token is a first set value, or may indicate that a remainder obtained after a current second value of the waiting token is divided by K is equal to the number of the classifier y, or may indicate that a difference between the number of the classifier y and a remainder obtained after the current second value of the waiting token is divided by K is a second set value), where the method further includes that the classifier y updates the current second value of the waiting token according to the preset policy, where the second value is greater than the first value, or the second value is less than the first value.

To better understand and implement the foregoing solutions, some specific application scenarios are used as examples in the following for illustration.

Figure 3A:
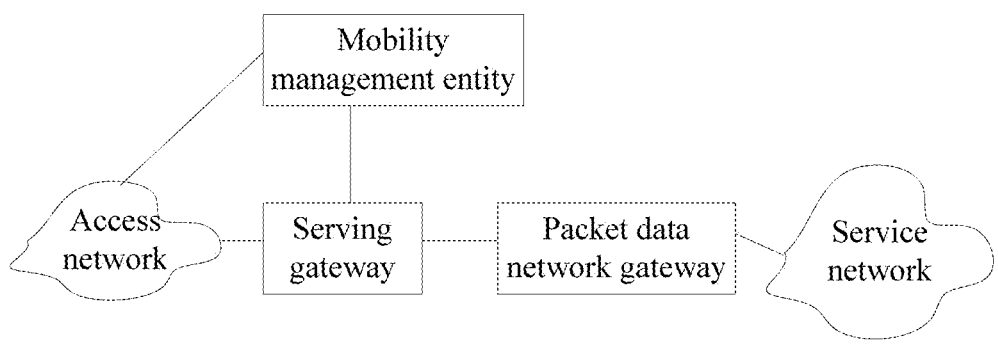
FIG. 3A is a schematic diagram of a network architecture according to an embodiment of the present disclosure.
Figure 3B:
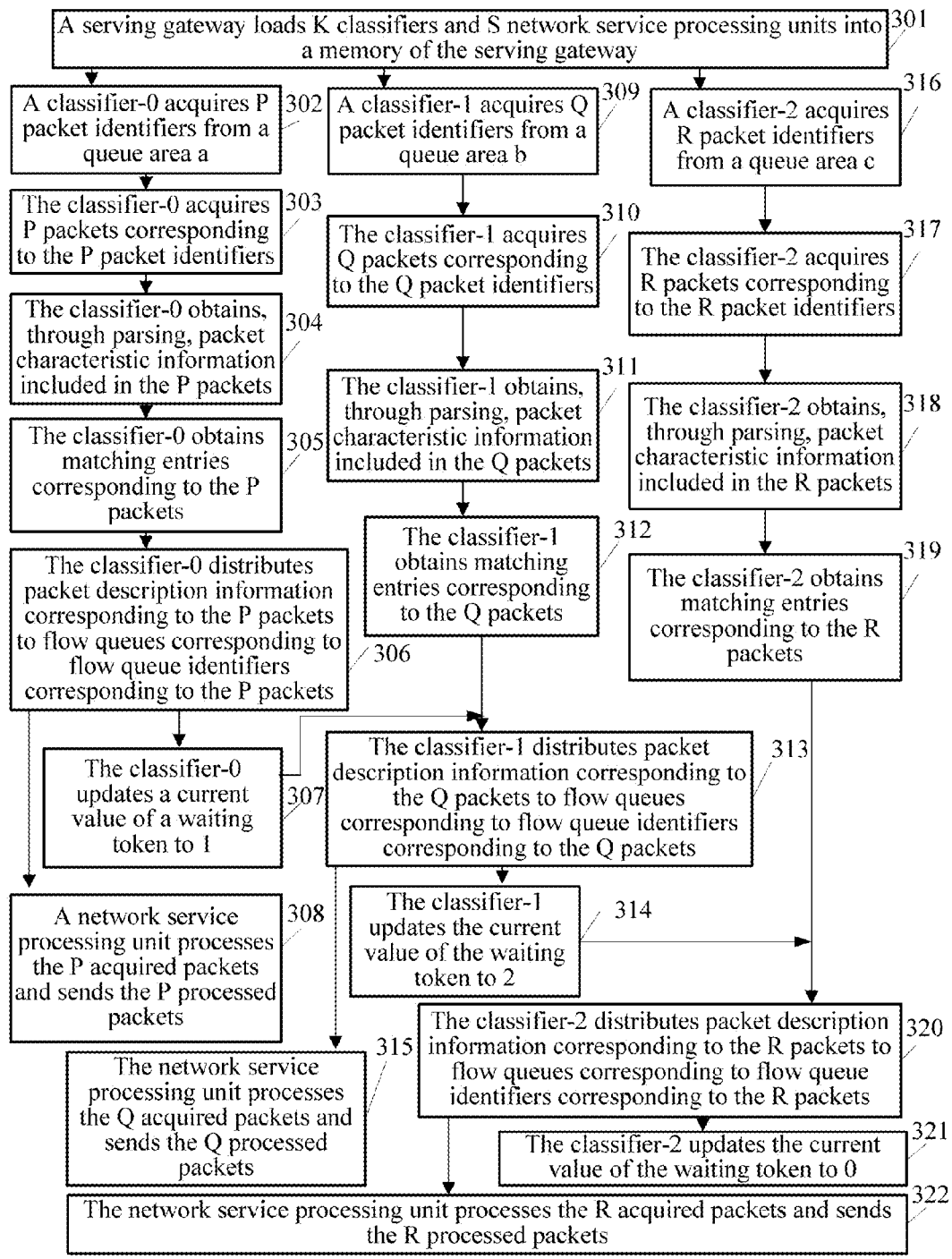
FIG. 3B is a schematic flowchart of another packet processing method applied to a network device according to an embodiment of the present disclosure.

Referring to FIG. 3A, FIG. 3A is a schematic diagram of a network architecture according to an embodiment of the present disclosure. A packet processing method applied to a network device, as shown in FIG. 3B, may be implemented on a serving gateway in the network architecture shown in FIG. 3A. The packet processing method shown in FIG. 3B may include the following steps.

Step 301: The serving gateway loads K classifiers and S network service processing units into a memory of the serving gateway.

The serving gateway may include a multi-core processor, a storage (the storage includes a memory), a network adapter, and the like.

Figure 3C:
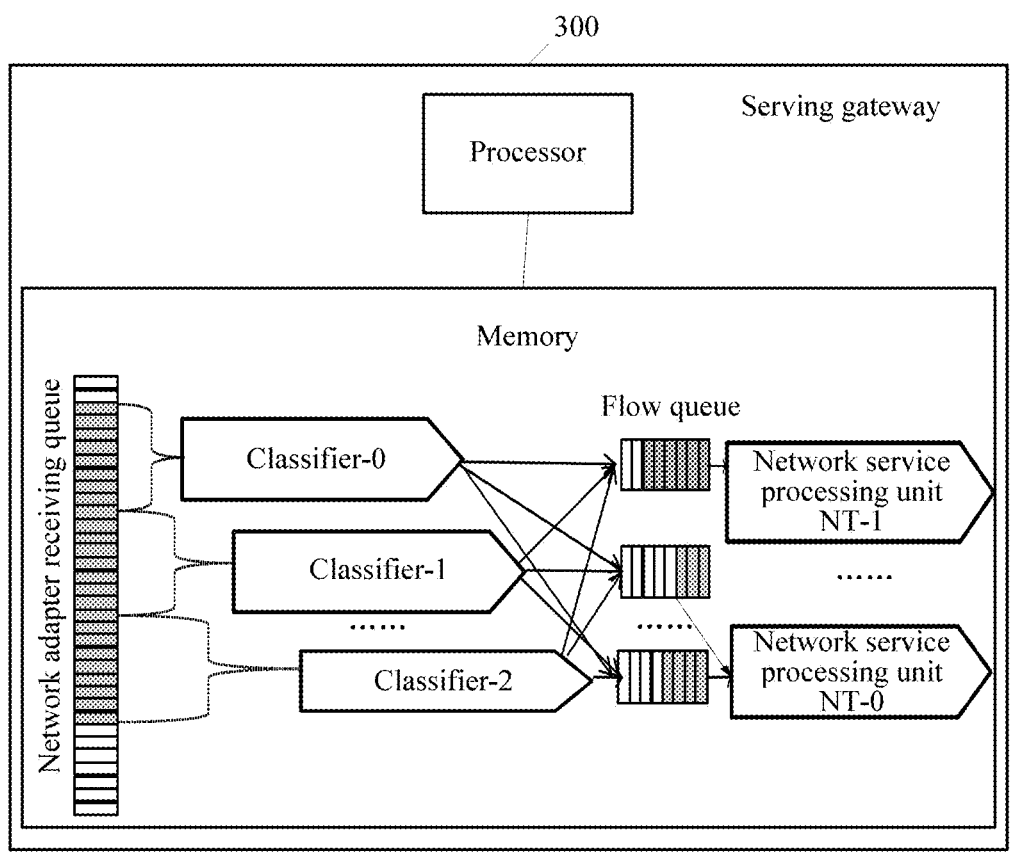
FIG. 3C is a schematic diagram of an internal architecture of a serving gateway according to an embodiment of the present disclosure.

Referring to FIG. 3C, FIG. 3C is a schematic diagram of an internal architecture of a serving gateway 300 according to an embodiment of the present disclosure. In the following exemplary scenario, that the K classifiers include a Classifier-0, a Classifier-1, and a Classifier-2, and that the S network service processing units include a network service processing unit NT-0 and a network service processing unit NT-1.

A waiting token is stored in the memory of the serving gateway, where a possible quantity of values of the waiting token is K. Possible values of the waiting token are 0 and 1 when K=2, possible values of the waiting token are 0, 1, and 2 when K=3, and so on. In this embodiment, K=3 is used as an example and therefore, the possible values of the waiting token are 0, 1, and 2.

An initial value of the waiting token may be 0.

Figure 3D:
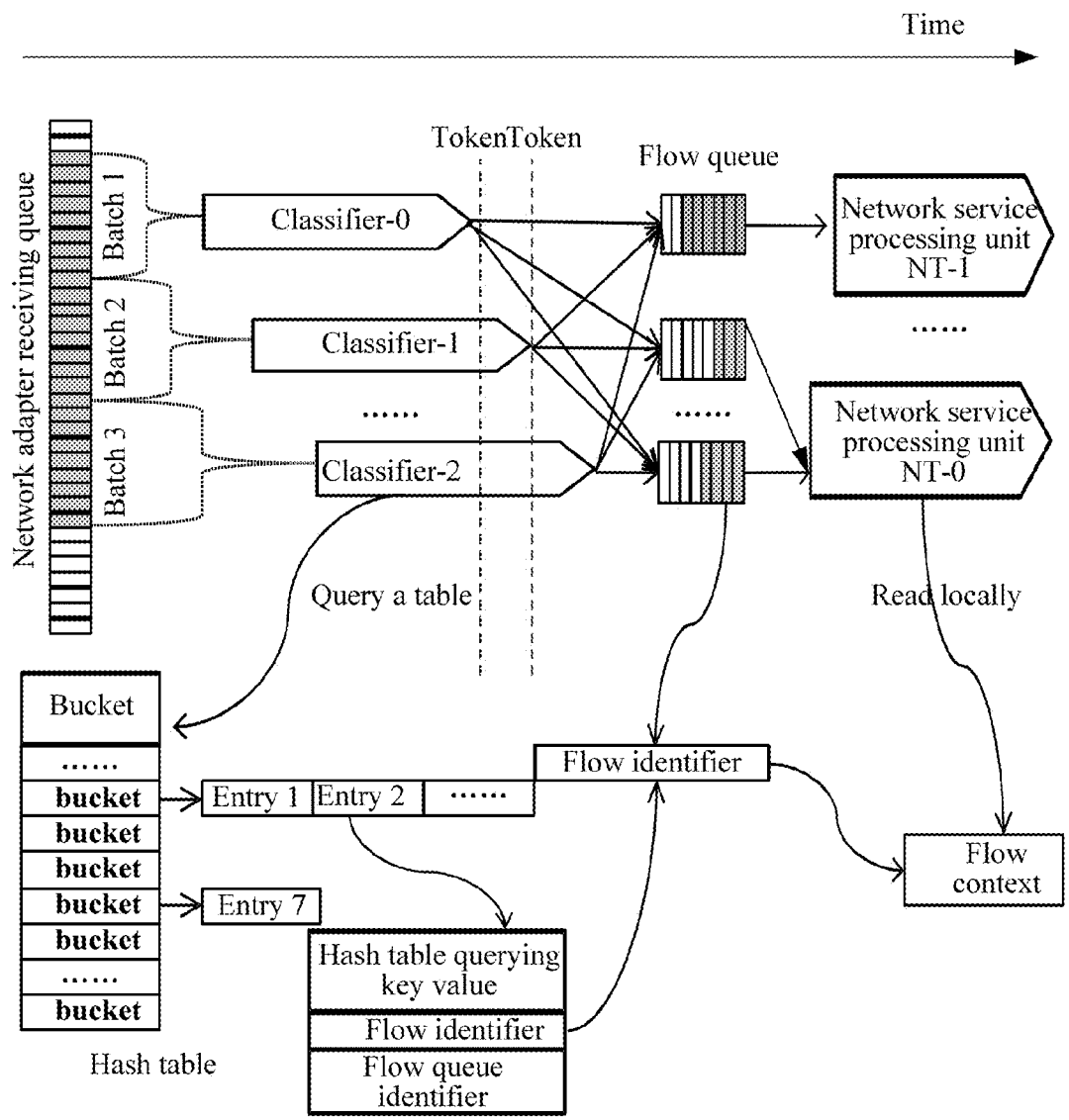
FIG. 3D is a schematic diagram of data transfer when the method shown in FIG. 3B is implemented in the internal architecture of the serving gateway according to an embodiment of the present disclosure.

FIG. 3D is a schematic diagram of data transfer when the method shown in FIG. 3B is implemented in the internal architecture of the serving gateway 300 according to an embodiment of the present disclosure.

Step 302: The Classifier-0 acquires P packet identifiers from a queue area a, where the P packet identifiers correspond to the Classifier-0 and is in a network adapter receiving queue in the serving gateway 300.

Step 303: The Classifier-0 acquires P packets corresponding to the P packet identifiers.

Step 304: The Classifier-0 parses the P packets to obtain packet characteristic information included in the P packets.

Step 305: The Classifier-0 obtains matching entries corresponding to the P packets. The Classifier-0 performs a table querying operation using the packet characteristic information included in the P packets as table querying key values in order to obtain the matching entries corresponding to the P packets, where the matching entries corresponding to the P packets include flow queue identifiers corresponding to the P packets and flow identifiers of service flows to which the P packets belong.

Step 306: The Classifier-0 distributes packet description information corresponding to the P packets to flow queues corresponding to the flow queue identifiers corresponding to the P packets when the Classifier-0 detects that a current value of the waiting token is equal to a number of the Classifier-0 (the current value of the waiting token is equal to an initial value 0 of the waiting token, and then is equal to the number 0 of the Classifier-0).

Packet description information corresponding to a packet i in the P packets is distributed to a flow queue corresponding to a determined flow queue identifier corresponding to the packet i, and packet description information corresponding to a packet j in the P packets is distributed to a flow queue corresponding to a determined flow queue identifier corresponding to the packet j, where the packet i and the packet j are any two packets in the P packets.

If a time at which the packet i is enqueued to the queue area a in the network adapter receiving queue is earlier than a time at which the packet j is enqueued to the queue area a in the network adapter receiving queue, a time at which the packet description information corresponding to the packet i is distributed to the flow queue corresponding to the determined flow queue identifier corresponding to the packet i is earlier than a time at which the packet description information corresponding to the packet j is distributed to the flow queue corresponding to the determined flow queue identifier corresponding to the packet j.

Step 307: The Classifier-0 updates the current value of the waiting token to 1.

The network service processing unit NT-0 and/or the network service processing unit NT-1 acquires, based on the packet identifiers of the P packets, the P packets, where the packet identifiers of the P packets are included in the packet description information that corresponds to the P packets and is distributed to the flow queues, the network service processing unit NT-0 and/or the network service processing unit NT-1 acquires, based on the flow identifiers of the service flows to which the P packets belong, flow contexts of the service flows to which the P packets belong, where the flow identifiers of the service flows to which the P packets belong are included in the packet description information that corresponds to the P packets and is distributed to the flow queues.

Step 308: The network service processing unit processes the P acquired packets, and sends the P processed packets. The network service processing unit NT-0 and/or the network service processing unit NT-1 processes, based on the acquired flow contexts of the service flows to which the P packets belong, the P acquired packets, and sends the P processed packets.

The network service processing unit NT-0 or the network service processing unit NT-1 may acquire, based on a packet identifier of the packet i, the packet i, where the packet identifier of the packet i is included in the packet description information that corresponds to the packet i and is distributed to the flow queue, acquires, based on a flow identifier of a service flow to which the packet i belongs, a flow context of the service flow to which the packet i belongs, where the flow identifier of the service flow to which the packet i belongs is included in the packet description information that corresponds to the packet i and is distributed to the flow queue, and processes, based on the acquired flow context of the service flow to which the packet i belongs, the acquired packet i, and sends the processed packet i. The network service processing unit NT-0 or the network service processing unit NT-1 may acquire, based on a packet identifier of the packet j, the packet j, where the packet identifier of the packet j is included in the packet description information that corresponds to the packet j and is distributed to the flow queue, may acquire, based on a flow identifier of a service flow to which the packet j belongs, a flow context of the service flow to which the packet j belongs, where the flow identifier of the service flow to which the packet j belongs is included in the packet description information that corresponds to the packet j and is distributed to the flow queue, and processes, based on the acquired flow context of the service flow to which the packet j belongs, the acquired packet j, and sends the processed packet j.

Step 309: The Classifier-1 acquires Q packet identifiers from a queue area b. The Q packet identifiers correspond to the Classifier-1 and is in the network adapter receiving queue in the serving gateway.

Step 310: The Classifier-1 acquires Q packets corresponding to the Q packet identifiers.

Step 311: The Classifier-1 parses the Q packets to obtain packet characteristic information included in the Q packets.

Step 312: The Classifier-1 obtains matching entries corresponding to the Q packets. The Classifier-1 performs a table querying operation using the packet characteristic information included in the Q packets as table querying key values in order to obtain matching entries corresponding to the Q packets, where the matching entries corresponding to the Q packets include flow queue identifiers corresponding to the Q packets and flow identifiers of service flows to which the Q packets belong.

Step 313: Classifier-1 distributes packet description information corresponding to the Q packets to flow queues corresponding to the flow queue identifiers corresponding to the Q packets. When the Classifier-1 detects that the current value of the waiting token is equal to a number of the Classifier-1 (the current value of the waiting token is updated to 1 in step 307, and then is equal to the number 1 of the Classifier-1), the Classifier-1 distributes packet description information corresponding to the Q packets to flow queues corresponding to the flow queue identifiers corresponding to the Q packets.

Packet description information corresponding to a packet m in the Q packets is distributed to a flow queue corresponding to a determined flow queue identifier corresponding to the packet m, and packet description information corresponding to a packet n in the Q packets is distributed to a flow queue corresponding to a determined flow queue identifier corresponding to the packet n, where the packet m and the packet n may be any two packets in the Q packets.

If a time at which the packet m is enqueued to the queue area b in the network adapter receiving queue is earlier than a time at which the packet n is enqueued to the queue area b in the network adapter receiving queue, a time at which the packet description information corresponding to the packet m is distributed to the flow queue corresponding to the determined flow queue identifier corresponding to the packet m is earlier than a time at which the packet description information corresponding to the packet n is distributed to the flow queue corresponding to the determined flow queue identifier corresponding to the packet n.

Step 314: The Classifier-1 updates the current value of the waiting token to 2.

Step 315: The network service processing unit processes the Q acquired packets and sends the Q processed packets. The network service processing unit NT-0 and/or the network service processing unit NT-1 acquires, based on the packet identifiers of the Q packets, the Q packets, where the packet identifiers of the Q packets are included in the packet description information that corresponds to the Q packets and is distributed to the flow queues. The network service processing unit NT-0 and/or the network service processing unit NT-1 acquires, based on the flow identifiers of the service flows to which the Q packets belong, flow contexts of the service flows to which the Q packets belong, where the flow identifiers of the service flows to which the Q packets belong are included in the packet description information that corresponds to the Q packets and is distributed to the flow queues, and the network service processing unit NT-0 and/or the network service processing unit NT-1 processes, based on the acquired flow contexts of the service flows to which the Q packets belong, the Q acquired packets, and sends the Q processed packets.

The network service processing unit NT-0 or the network service processing unit NT-1 may acquire, based on a packet identifier of the packet m, the packet m, where the packet identifier of the packet m is included in the packet description information that corresponds to the packet m and is distributed to the flow queue, acquires, based on a flow identifier of a service flow to which the packet m belongs, a flow context of the service flow to which the packet m belongs, where the flow identifier of the service flow to which the packet m belongs is included in the packet description information that corresponds to the packet m and is distributed to the flow queue, and processes, based on the acquired flow context of the service flow to which the packet m belongs, the acquired packet m, and sends the processed packet m. The network service processing unit NT-0 or the network service processing unit NT-1 may acquire, based on a packet identifier of the packet n, the packet n, where the packet identifier of the packet n is included in the packet description information that corresponds to the packet n and is distributed to the flow queue, may acquire, based on a flow identifier of a service flow to which the packet n belongs, a flow context of the service flow to which the packet n belongs, where the flow identifier of the service flow to which the packet n belongs is included in the packet description information that corresponds to the packet n and is distributed to the flow queue, and processes, based on the acquired flow context of the service flow to which the packet n belongs, the acquired packet n, and sends the processed packet n.

Step 316: The Classifier-2 acquires R packet identifiers from a queue area c. The R packet identifiers correspond to the Classifier-2 and is in the network adapter receiving queue in the serving gateway.

Step 317: The Classifier-2 acquires R packets corresponding to the R packet identifiers.

Step 318: The Classifier-2 parses the R packets to obtain packet characteristic information included in the R packets.

Step 319: The Classifier-2 obtains matching entries corresponding to the R packets. The Classifier-2 performs a table querying operation using the packet characteristic information included in the R packets as table querying key values in order to obtain matching entries corresponding to the R packets, where the matching entries corresponding to the R packets include flow queue identifiers corresponding to the R packets and flow identifiers of service flows to which the R packets belong.

Step 320: The Classifier-2 distributes packet description information corresponding to the R packets to flow queues corresponding to the flow queue identifiers corresponding to the R packets when the Classifier-2 detects that the current value of the waiting token is equal to a number of the Classifier-2 (the current value of the waiting token is updated to 2 in step 314, and then is equal to the number 2 of the Classifier-2).

Packet description information corresponding to a packet e in the R packets is distributed to a flow queue corresponding to a determined flow queue identifier corresponding to the packet e, and packet description information corresponding to a packet f in the R packets is distributed to a flow queue corresponding to a determined flow queue identifier corresponding to the packet f, where the packet e and the packet f may be any two packets in the R packets.

If a time at which the packet e is enqueued to the queue area c in the network adapter receiving queue is earlier than a time at which the packet f is enqueued to the queue area c in the network adapter receiving queue, a time at which the packet description information corresponding to the packet e is distributed to the flow queue corresponding to the determined flow queue identifier corresponding to the packet e is earlier than a time at which the packet description information corresponding to the packet f is distributed to the flow queue corresponding to the determined flow queue identifier corresponding to the packet f.

Step 321: The Classifier-2 updates the current value of the waiting token to 0.

Q, P, and R are positive integers. A time at which the Q packets are enqueued to the queue area b in the network adapter receiving queue is later than a time at which the P packets are enqueued to the queue area a in the network adapter receiving queue, and a time at which the R packets are enqueued to the queue area c in the network adapter receiving queue is later than the time at which the Q packets are enqueued to the queue area b in the network adapter receiving queue.

Step 322: The network service processing unit processes the R acquired packets, and sends the R processed packets. The network service processing unit NT-0 and/or the network service processing unit NT-1 acquires, based on the packet identifiers of the R packets, the R packets, where the packet identifiers of the R packets are included in the packet description information that corresponds to the R packets and is distributed to the flow queues, the network service processing unit NT-0 and/or the network service processing unit NT-1 acquires, based on the flow identifiers of the service flows to which the R packets belong, flow contexts of the service flows to which the R packets belong, where the flow identifiers of the service flows to which the R packets belong are included in the packet description information that corresponds to the R packets and is distributed to the flow queues, and the network service processing unit NT-0 and/or the network service processing unit NT-1 processes, based on the acquired flow contexts of the service flows to which the R packets belong, the R acquired packets, and sends the R processed packets.

The network service processing unit NT-0 or the network service processing unit NT-1 may acquire, based on a packet identifier of the packet e, the packet e, where the packet identifier of the packet e is included in the packet description information that corresponds to the packet e and is distributed to the flow queue, acquires, based on a flow identifier of a service flow to which the packet e belongs, a flow context of the service flow to which the packet e belongs, where the flow identifier of the service flow to which the packet e belongs is included in the packet description information that corresponds to the packet e and is distributed to the flow queue, and processes, based on the acquired flow context of the service flow to which the packet e belongs, the acquired packet e, and sends the processed packet e. The network service processing unit NT-0 or the network service processing unit NT-1 may acquire, based on a packet identifier of the packet f, the packet f, where the packet identifier of the packet f is included in the packet description information that corresponds to the packet f and is distributed to the flow queue, may acquire, based on a flow identifier of a service flow to which the packet f belongs, a flow context of the service flow to which the packet f belongs, where the flow identifier of the service flow to which the packet f belongs is included in the packet description information that corresponds to the packet f and is distributed to the flow queue, and processes, based on the acquired flow context of the service flow to which the packet f belongs, the acquired packet f, and sends the processed packet f.

It may be understood that steps 302 to 305 may be concurrently executed with steps 309 to 312, and steps 309 to 312 may be concurrently executed with steps 316 to 319.

Further, the Classifier-2 may update a packet address recorded in each area in the network adapter receiving queue. The Classifier-2 may instruct a network adapter to continue to receive a packet. The network adapter enqueues the received packet to the network adapter receiving queue, and then steps 302 to 322 may be cyclically executed.

It can be learned that, in this embodiment, K classifiers and S network service processing units are deployed in a serving gateway. A network adapter receiving queue is divided into multiple queue areas. Each classifier may acquire a packet identifier from a queue area that corresponds to the classifier and is in the network adapter receiving queue, that is, the network adapter receiving queue has multiple information reading interfaces such that the K classifiers may concurrently read packet identifiers from corresponding queue areas in the network adapter receiving queue, and the K classifiers may further concurrently determine, based on the packet identifiers acquired by the K classifiers, corresponding flow queue identifiers, related operations before the K classifiers distribute packet description information to flow queues may all be concurrently executed, and concurrent execution makes processing times of the related operations become partially or completely overlapped, and required times and processing complexity of the related operations before the K classifiers distribute the packet description information to the flow queues are generally greater than a required time and processing complexity of an operation that the K classifiers distribute the packet description information to the flow queues. Therefore, multiple software-instance classifiers are introduced to the foregoing solution in this embodiment, which helps to improve a packet distribution processing capability of a serving gateway, and further helps to enable the serving gateway to support a scenario of larger bandwidth.

In addition, a time at which the Q packets are enqueued to a queue area b in the network adapter receiving queue is later than a time at which the P packets are enqueued to a queue area a in the network adapter receiving queue. Therefore, the classifier y distributes, after the classifier x distributes packet description information corresponding to the P packets to flow queues corresponding to determined flow queue identifiers corresponding to the P packets, packet description information corresponding to the Q packets to flow queues corresponding to determined flow queue identifiers corresponding to the Q packets. The foregoing time sequence control helps to meet a sequence preserving requirement of packet distribution to some extent.

In this embodiment, that a network device may be a serving gateway is mainly used as an example. Certainly, the network device that executes the method in this embodiment of the present disclosure may also be a PGW, or a gateway device of another type, or a data-plane convergence node of another type in a communications network.

Figure 4A:
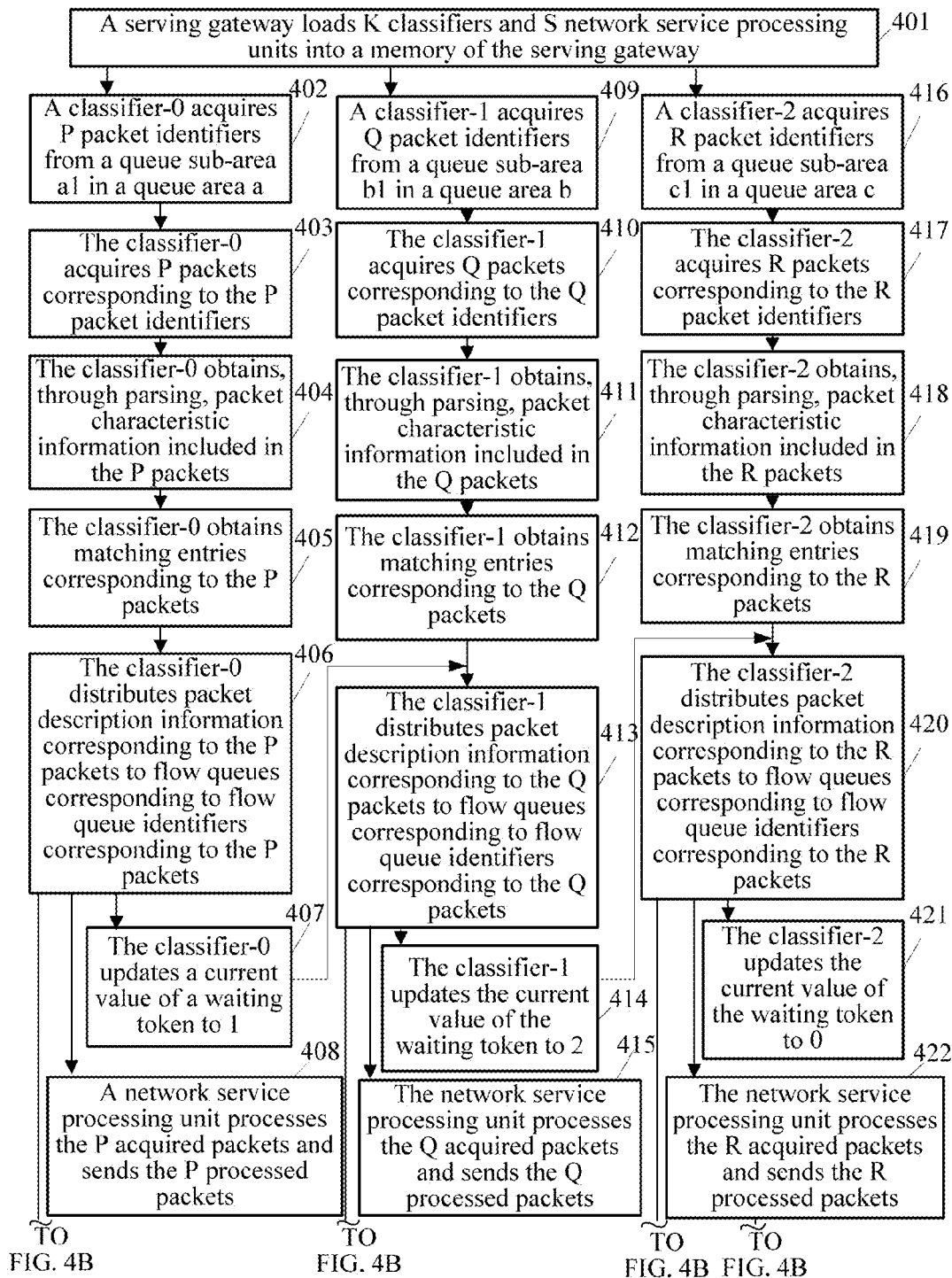
FIG. 4A and FIG. 4B are a schematic flowchart of another packet processing method applied to a network device according to an embodiment of the present disclosure.
Figure 4B:
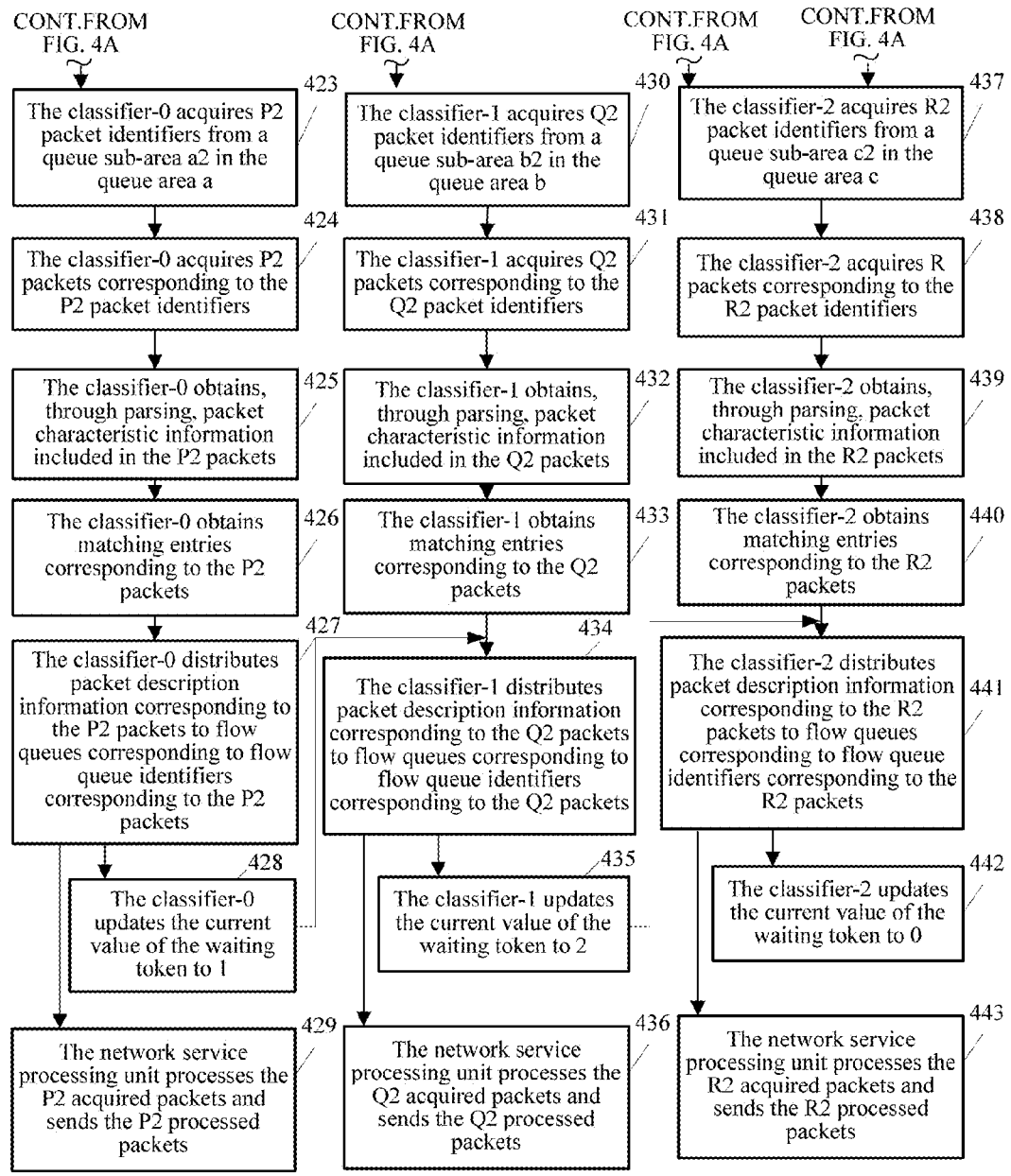

Referring to FIG. 3A, FIG. 3A is a schematic diagram of a network architecture according to an embodiment of the present disclosure. A packet processing method applied to a network device, as shown in FIG. 4A and FIG. 4B, may be further implemented on a serving gateway in the network architecture shown in FIG. 3A. The packet processing method may include the following steps.

Step 401: The serving gateway loads K classifiers and S network service processing units into a memory of the serving gateway.

The serving gateway may include a multi-core processor, a storage (the storage includes a memory), a network adapter, and the like.

In the following exemplary scenario, that the K classifiers include a Classifier-0, a Classifier-1, and a Classifier-2, and that the S network service processing units include a network service processing unit NT-0 and a network service processing unit NT-1.

A waiting token is stored in the memory of the serving gateway, where a possible quantity of values of the waiting token is K. Possible values of the waiting token are 0 and 1 when K=2, possible values of the waiting token are 0, 1, and 2 when K=3, and so on. In this embodiment, K=3 is used as an example, and therefore, the possible values of the waiting token are 0, 1, and 2.

An initial value of the waiting token may be 0.

Step 402: The Classifier-0 acquires P packet identifiers from a queue sub-area a1 is in a queue area a, where the queue sub-area a1 corresponds to the Classifier-0 and is in the queue area a in a network adapter receiving queue in the serving gateway.

The network adapter receiving queue is divided into three queue areas, that is, the queue area a, a queue area b, and a queue area c. The queue area a includes the queue sub-area a1 and a queue sub-area a2, where member numbers of queue members in the queue sub-area a1 are adjacent, member numbers of queue members in the queue sub-area a2 are adjacent, and member numbers of queue members between the queue sub-area a1 and the queue sub-area a2 are not adjacent. The queue area b includes a queue sub-area b1 and a queue sub-area b2, where member numbers of queue members in the queue sub-area b1 are adjacent, member numbers of queue members in the queue sub-area b2 are adjacent, and member numbers of queue members between the queue sub-area b1 and the queue sub-area b2 are not adjacent. The queue area c includes a queue sub-area c1 and a queue sub-area c2, where member numbers of queue members in the queue sub-area c1 are adjacent, member numbers of queue members in the queue sub-area c2 are adjacent, and member numbers of queue members between the queue sub-area c1 and the queue sub-area c2 are not adjacent.

Step 403: The Classifier-0 acquires P packets corresponding to the P packet identifiers.

Step 404: The Classifier-0 parses the P packets to obtain packet characteristic information included in the P packets.

Step 405: The Classifier-0 obtains matching entries corresponding to the P packets. The Classifier-0 performs a table querying operation using the packet characteristic information included in the P packets as table querying key values in order to obtain matching entries corresponding to the P packets, where the matching entries corresponding to the P packets include flow queue identifiers corresponding to the P packets and flow identifiers of service flows to which the P packets belong.

Step 406: The Classifier-0 distributes packet description information corresponding to the P packets to flow queues corresponding to the flow queue identifiers corresponding to the P packets when the Classifier-0 detects that a current value of the waiting token is equal to a number of the Classifier-0 (the current value of the waiting token is equal to an initial value 0 of the waiting token, and then is equal to the number 0 of the Classifier-0).

Packet description information corresponding to a packet i in the P packets is distributed to a flow queue corresponding to a determined flow queue identifier corresponding to the packet i, and packet description information corresponding to a packet j in the P packets is distributed to a flow queue corresponding to a determined flow queue identifier corresponding to the packet j, where the packet i and the packet j are any two packets in the P packets.

If a time at which the packet i is enqueued to the queue sub-area a1 in the queue area a in the network adapter receiving queue is earlier than a time at which the packet j is enqueued to the queue sub-area a1 in the queue area a in the network adapter receiving queue, a time at which the packet description information corresponding to the packet i is distributed to the flow queue corresponding to the determined flow queue identifier corresponding to the packet i is earlier than a time at which the packet description information corresponding to the packet j is distributed to the flow queue corresponding to the determined flow queue identifier corresponding to the packet j.

Step 407: The Classifier-0 updates the current value of the waiting token to 1.

Step 408: The network service processing unit processes the P acquired packets, and sends the P processed packets. The network service processing unit NT-0 and/or the network service processing unit NT-1 acquires, based on the packet identifiers of the P packets, the P packets, where the packet identifiers of the P packets are included in the packet description information that corresponds to the P packets and is distributed to the flow queues, the network service processing unit NT-0 and/or the network service processing unit NT-1 acquires, based on the flow identifiers of the service flows to which the P packets belong, flow contexts of the service flows to which the P packets belong, where the flow identifiers of the service flows to which the P packets belong are included in the packet description information that corresponds to the P packets and is distributed to the flow queues, and the network service processing unit NT-0 and/or the network service processing unit NT-1 processes, based on the acquired flow contexts of the service flows to which the P packets belong, the P acquired packets, and sends the P processed packets.

The network service processing unit NT-0 or the network service processing unit NT-1 may acquire, based on a packet identifier of the packet i, the packet i, where the packet identifier of the packet i is included in the packet description information that corresponds to the packet i and is distributed to the flow queue, acquires, based on a flow identifier of a service flow to which the packet i belongs, a flow context of the service flow to which the packet i belongs, where the flow identifier of the service flow to which the packet i belongs is included in the packet description information that corresponds to the packet i and is distributed to the flow queue, and processes, based on the acquired flow context of the service flow to which the packet i belongs, the acquired packet i, and sends the processed packet i. The network service processing unit NT-0 or the network service processing unit NT-1 may acquire, based on a packet identifier of the packet j, the packet j, where the packet identifier of the packet j is included in the packet description information that corresponds to the packet j and is distributed to the flow queue, may acquire, based on a flow identifier of a service flow to which the packet j belongs, a flow context of the service flow to which the packet j belongs, where the flow identifier of the service flow to which the packet j belongs is included in the packet description information that corresponds to the packet j and is distributed to the flow queue, and processes, based on the acquired flow context of the service flow to which the packet j belongs, the acquired packet j, and sends the processed packet j.

Step 409: The Classifier-1 acquires Q packet identifiers from a queue sub-area b1 is in a queue area b, where the queue sub-area b1 corresponds to the Classifier-1 and is in the queue area b in the network adapter receiving queue in the serving gateway.

Step 410: The Classifier-1 acquires Q packets corresponding to the Q packet identifiers.

Step 411: The Classifier-1 parses the Q packets to obtain packet characteristic information included in the Q packets.

Step 412: The Classifier-1 obtains matching entries corresponding to the Q packets. The Classifier-1 performs a table querying operation using the packet characteristic information included in the Q packets as table querying key values in order to obtain matching entries corresponding to the Q packets, where the matching entries corresponding to the Q packets include flow queue identifiers corresponding to the Q packets and flow identifiers of service flows to which the Q packets belong.

Step 413: The Classifier-1 distributes packet description information corresponding to the Q packets to flow queues corresponding to the flow queue identifiers corresponding to the Q packets when the Classifier-1 detects that the current value of the waiting token is equal to a number of the Classifier-1 (the current value of the waiting token is updated to 1 in step 407, and then is equal to the number 1 of the Classifier-1).

Packet description information corresponding to a packet m in the Q packets is distributed to a flow queue corresponding to a determined flow queue identifier corresponding to the packet m, and packet description information corresponding to a packet n in the Q packets is distributed to a flow queue corresponding to a determined flow queue identifier corresponding to the packet n, where the packet m and the packet n may be any two packets in the Q packets.

If a time at which the packet m is enqueued to the queue sub-area b1 in the queue area b in the network adapter receiving queue is earlier than a time at which the packet n is enqueued to the queue sub-area b1 in the queue area b in the network adapter receiving queue, a time at which the packet description information corresponding to the packet m is distributed to the flow queue corresponding to the determined flow queue identifier corresponding to the packet m is earlier than a time at which the packet description information corresponding to the packet n is distributed to the flow queue corresponding to the determined flow queue identifier corresponding to the packet n.

Step 414: The Classifier-1 updates the current value of the waiting token to 2.

Step 415: The network service processing unit processes the Q acquired packets, and sends the Q processed packets. The network service processing unit NT-0 and/or the network service processing unit NT-1 acquires, based on the packet identifiers of the Q packets, the Q packets, where the packet identifiers of the Q packets are included in the packet description information that corresponds to the Q packets and is distributed to the flow queues, the network service processing unit NT-0 and/or the network service processing unit NT-1 acquires, based on the flow identifiers of the service flows to which the Q packets belong, flow contexts of the service flows to which the Q packets belong, where the flow identifiers of the service flows to which the Q packets belong are included in the packet description information that corresponds to the Q packets and is distributed to the flow queues, and the network service processing unit NT-0 and/or the network service processing unit NT-1 processes, based on the acquired flow contexts of the service flows to which the Q packets belong, the Q acquired packets, and sends the Q processed packets.

The network service processing unit NT-0 or the network service processing unit NT-1 may acquire, based on a packet identifier of the packet m, the packet m, where the packet identifier of the packet m is included in the packet description information that corresponds to the packet m and is distributed to the flow queue, acquires, based on a flow identifier of a service flow to which the packet m belongs, a flow context of the service flow to which the packet m belongs, where the flow identifier of the service flow to which the packet m belongs is included in the packet description information that corresponds to the packet m and is distributed to the flow queue, and processes, based on the acquired flow context of the service flow to which the packet m belongs, the acquired packet m, and sends the processed packet m. The network service processing unit NT-0 or the network service processing unit NT-1 may acquire, based on a packet identifier of the packet n, the packet n, where the packet identifier of the packet n is included in the packet description information that corresponds to the packet n and is distributed to the flow queue, may acquire, based on a flow identifier of a service flow to which the packet n belongs, a flow context of the service flow to which the packet n belongs, where the flow identifier of the service flow to which the packet n belongs is included in the packet description information that corresponds to the packet n and is distributed to the flow queue, and processes, based on the acquired flow context of the service flow to which the packet n belongs, the acquired packet n, and sends the processed packet n.

Step 416: The Classifier-2 acquires R packet identifiers from a queue sub-area c1 is in a queue area c, where the queue sub-area c1 corresponds to the Classifier-2 and is in the queue area c in the network adapter receiving queue in the serving gateway.

Step 417: The Classifier-2 acquires R packets corresponding to the R packet identifiers.

Step 418: The Classifier-2 parses the R packets to obtain packet characteristic information included in the R packets.

Step 419: The Classifier-2 obtains matching entries corresponding to the R packets. The Classifier-2 performs a table querying operation using the packet characteristic information included in the R packets as table querying key values in order to obtain matching entries corresponding to the R packets, where the matching entries corresponding to the R packets include flow queue identifiers corresponding to the R packets and flow identifiers of service flows to which the R packets belong.

Step 420: The Classifier-2 distributes packet description information corresponding to the R packets to flow queues corresponding to the flow queue identifiers corresponding to the R packets when the Classifier-2 detects that the current value of the waiting token is equal to a number of the Classifier-2 (the current value of the waiting token is updated to 2 in step 414, and then is equal to the number 2 of the Classifier-2).

Packet description information corresponding to a packet e in the R packets is distributed to a flow queue corresponding to a determined flow queue identifier corresponding to the packet e, and packet description information corresponding to a packet f in the R packets is distributed to a flow queue corresponding to a determined flow queue identifier corresponding to the packet f, where the packet e and the packet f may be any two packets in the R packets.

If a time at which the packet e is enqueued to the queue area c in the network adapter receiving queue is earlier than a time at which the packet f is enqueued to the queue area c in the network adapter receiving queue, a time at which the packet description information corresponding to the packet e is distributed to the flow queue corresponding to the determined flow queue identifier corresponding to the packet e is earlier than a time at which the packet description information corresponding to the packet f is distributed to the flow queue corresponding to the determined flow queue identifier corresponding to the packet f.

Step 421: The Classifier-2 updates the current value of the waiting token to 0.

Q, P, and R are positive integers. A time at which the Q packets are enqueued to the queue sub-area b1 in the queue area b in the network adapter receiving queue is later than a time at which the P packets are enqueued to the queue sub-area a1 in the queue area a in the network adapter receiving queue, and a time at which the R packets are enqueued to the queue sub-area c1 in the queue area c in the network adapter receiving queue is later than the time at which the Q packets are enqueued to the queue sub-area b1 in the queue area b in the network adapter receiving queue.

Step 422: The network service processing unit processes the R acquired packets, and sends the R processed packets. The network service processing unit NT-0 and/or the network service processing unit NT-1 acquires, based on the packet identifiers of the R packets, the R packets, where the packet identifiers of the R packets are included in the packet description information that corresponds to the R packets and is distributed to the flow queues, the network service processing unit NT-0 and/or the network service processing unit NT-1 acquires, based on the flow identifiers of the service flows to which the R packets belong, flow contexts of the service flows to which the R packets belong, where the flow identifiers of the service flows to which the R packets belong are included in the packet description information that corresponds to the R packets and is distributed to the flow queues, and the network service processing unit NT-0 and/or the network service processing unit NT-1 processes, based on the acquired flow contexts of the service flows to which the R packets belong, the R acquired packets, and sends the R processed packets.

The network service processing unit NT-0 or the network service processing unit NT-1 may acquire, based on a packet identifier of the packet e, the packet e, where the packet identifier of the packet e is included in the packet description information that corresponds to the packet e and is distributed to the flow queue, acquires, based on a flow identifier of a service flow to which the packet e belongs, a flow context of the service flow to which the packet e belongs, where the flow identifier of the service flow to which the packet e belongs is included in the packet description information that corresponds to the packet e and is distributed to the flow queue, and processes, based on the acquired flow context of the service flow to which the packet e belongs, the acquired packet e, and sends the processed packet e. The network service processing unit NT-0 or the network service processing unit NT-1 may acquire, based on a packet identifier of the packet f, the packet f, where the packet identifier of the packet f is included in the packet description information that corresponds to the packet f and is distributed to the flow queue, may acquire, based on a flow identifier of a service flow to which the packet f belongs, a flow context of the service flow to which the packet f belongs, where the flow identifier of the service flow to which the packet f belongs is included in the packet description information that corresponds to the packet f and is distributed to the flow queue, and processes, based on the acquired flow context of the service flow to which the packet f belongs, the acquired packet f, and sends the processed packet f.

It may be understood that steps 402 to 405 may be concurrently executed with steps 409 to 412, and steps 409 to 412 may be concurrently executed with steps 416 to 419.

Step 423: The Classifier-0 acquires P2 packet identifiers from a queue sub-area a2 in the queue area a, where the queue sub-area a2 corresponds to the Classifier-0 and is in the queue area a in the network adapter receiving queue in the serving gateway.

Step 424: The Classifier-0 acquires P2 packets corresponding to the P2 packet identifiers.

Step 425: The Classifier-0 parses the P2 packets to obtain packet characteristic information included in the P2 packets.

Step 426: The Classifier-0 obtains matching entries corresponding to the P2 packets. The Classifier-0 performs a table querying operation using the packet characteristic information included in the P2 packets as table querying key values in order to obtain matching entries corresponding to the P2 packets, where the matching entries corresponding to the P2 packets include flow queue identifiers corresponding to the P2 packets and flow identifiers of service flows to which the P2 packets belong.

Step 427: The Classifier-0 distributes packet description information corresponding to the P2 packets to flow queues corresponding to the flow queue identifiers corresponding to the P2 packets when the Classifier-0 detects that the current value of the waiting token is equal to the number of the Classifier-0 (the current value of the waiting token is updated to 0 in step 421, and then is equal to the number 0 of the Classifier-0).

Packet description information corresponding to a packet i2 in the P2 packets is distributed to a flow queue corresponding to a determined flow queue identifier corresponding to the packet i2, and packet description information corresponding to a packet j2 in the P2 packets is distributed to a flow queue corresponding to a determined flow queue identifier corresponding to the packet j2, where the packet i2 and the packet j2 are any two packets in the P2 packets.

If a time at which the packet i2 is enqueued to the queue sub-area a2 in the queue area a in the network adapter receiving queue is earlier than a time at which the packet j2 is enqueued to the queue sub-area a2 in the queue area a in the network adapter receiving queue, a time at which the packet description information corresponding to the packet i2 is distributed to the flow queue corresponding to the determined flow queue identifier corresponding to the packet i2 is earlier than a time at which the packet description information corresponding to the packet j2 is distributed to the flow queue corresponding to the determined flow queue identifier corresponding to the packet j2.

Step 428: The Classifier-0 updates the current value of the waiting token to 1.

Step 429: The network service processing unit processes the P2 acquired packets, and sends the P2 processed packets. The network service processing unit NT-0 and/or the network service processing unit NT-1 acquires, based on the packet identifiers of the P2 packets, the P2 packets, where the packet identifiers of the P2 packets are included in the packet description information that corresponds to the P2 packets and is distributed to the flow queues, the network service processing unit NT-0 and/or the network service processing unit NT-1 acquires, based on the flow identifiers of the service flows to which the P2 packets belong, flow contexts of the service flows to which the P2 packets belong, where the flow identifiers of the service flows to which the P2 packets belong are included in the packet description information that corresponds to the P2 packets and is distributed to the flow queues, and the network service processing unit NT-0 and/or the network service processing unit NT-1 processes, based on the acquired flow contexts of the service flows to which the P2 packets belong, the P2 acquired packets, and sends the P2 processed packets.

The network service processing unit NT-0 or the network service processing unit NT-1 may acquire, based on a packet identifier of the packet i2, the packet i2, where the packet identifier of the packet i2 is included in the packet description information that corresponds to the packet i2 and is distributed to the flow queue, acquires, based on a flow identifier of a service flow to which the packet i2 belongs, a flow context of the service flow to which the packet i2 belongs, where the flow identifier of the service flow to which the packet i2 belongs is included in the packet description information that corresponds to the packet i2 and is distributed to the flow queue, and processes, based on the acquired flow context of the service flow to which the packet i2 belongs, the acquired packet i2, and sends the processed packet i2. The network service processing unit NT-0 or the network service processing unit NT-1 may acquire, based on a packet identifier of the packet j2, the packet j2, where the packet identifier of the packet j2 is included in the packet description information that corresponds to the packet j2 and is distributed to the flow queue, may acquire, based on a flow identifier of a service flow to which the packet j2 belongs, a flow context of the service flow to which the packet j2 belongs, where the flow identifier of the service flow to which the packet j2 belongs is included in the packet description information that corresponds to the packet j2 and is distributed to the flow queue, and processes, based on the acquired flow context of the service flow to which the packet j2 belongs, the acquired packet j2, and sends the processed packet j2.

Step 430: The Classifier-1 acquires Q2 packet identifiers from a queue sub-area b2 in the queue area b, where the queue sub-area b2 corresponds to the Classifier-1 and is in the queue area b in the network adapter receiving queue in the serving gateway.

Step 431: The Classifier-1 acquires Q2 packets corresponding to the Q2 packet identifiers.

Step 432: The Classifier-1 parses the Q2 packets to obtain packet characteristic information included in the Q2 packets.

Step 433: The Classifier-1 obtains matching entries corresponding to the Q2 packets. The Classifier-1 performs a table querying operation using the packet characteristic information included in the Q2 packets as table querying key values in order to obtain matching entries corresponding to the Q2 packets, where the matching entries corresponding to the Q2 packets include flow queue identifiers corresponding to the Q2 packets and flow identifiers of service flows to which the Q2 packets belong.

Step 434: The Classifier-1 distributes packet description information corresponding to the Q2 packets to flow queues corresponding to the flow queue identifiers corresponding to the Q2 packets when the Classifier-1 detects that the current value of the waiting token is equal to the number of the Classifier-1 (the current value of the waiting token is updated to 1 in step 428, and then is equal to the number 1 of the Classifier-1).

Packet description information corresponding to a packet m2 in the Q2 packets is distributed to a flow queue corresponding to a determined flow queue identifier corresponding to the packet m2, and packet description information corresponding to a packet n2 in the Q2 packets is distributed to a flow queue corresponding to a determined flow queue identifier corresponding to the packet n2, where the packet m2 and the packet n2 may be any two packets in the Q2 packets.

If a time at which the packet m2 is enqueued to the queue area b2 in the network adapter receiving queue is earlier than a time at which the packet n2 is enqueued to the queue area b2 in the network adapter receiving queue, a time at which the packet description information corresponding to the packet m2 is distributed to the flow queue corresponding to the determined flow queue identifier corresponding to the packet m2 is earlier than a time at which the packet description information corresponding to the packet n2 is distributed to the flow queue corresponding to the determined flow queue identifier corresponding to the packet n2.

Step 435: The Classifier-1 updates the current value of the waiting token to 2.

Step 436: The network service processing unit processes the Q2 acquired packets, and sends the Q2 processed packets. The network service processing unit NT-0 and/or the network service processing unit NT-1 acquires, based on the packet identifiers of the Q2 packets, the Q2 packets, where the packet identifiers of the Q2 packets are included in the packet description information that corresponds to the Q2 packets and is distributed to the flow queues, the network service processing unit NT-0 and/or the network service processing unit NT-1 acquires, based on the flow identifiers of the service flows to which the Q2 packets belong, flow contexts of the service flows to which the Q2 packets belong, where the flow identifiers of the service flows to which the Q2 packets belong are included in the packet description information that corresponds to the Q2 packets and is distributed to the flow queues, and the network service processing unit NT-0 and/or the network service processing unit NT-1 processes, based on the acquired flow contexts of the service flows to which the Q2 packets belong, the Q2 acquired packets, and sends the Q2 processed packets.

The network service processing unit NT-0 or the network service processing unit NT-1 may acquire, based on a packet identifier of the packet m2, the packet m2, where the packet identifier of the packet m2 is included in the packet description information that corresponds to the packet m2 and is distributed to the flow queue, acquires, based on a flow identifier of a service flow to which the packet m2 belongs, a flow context of the service flow to which the packet m2 belongs, where the flow identifier of the service flow to which the packet m2 belongs is included in the packet description information that corresponds to the packet m2 and is distributed to the flow queue, and processes, based on the acquired flow context of the service flow to which the packet m2 belongs, the acquired packet m2, and sends the processed packet m2. The network service processing unit NT-0 or the network service processing unit NT-1 may acquire, based on a packet identifier of the packet n2, the packet n2, where the packet identifier of the packet n2 is included in the packet description information that corresponds to the packet n2 and is distributed to the flow queue, may acquire, based on a flow identifier of a service flow to which the packet n2 belongs, a flow context of the service flow to which the packet n2 belongs, where the flow identifier of the service flow to which the packet n2 belongs is included in the packet description information that corresponds to the packet n2 and is distributed to the flow queue, and processes, based on the acquired flow context of the service flow to which the packet n2 belongs, the acquired packet n2, and sends the processed packet n2.

Step 437: The Classifier-2 acquires R2 packet identifiers from a queue sub-area c2 in the queue area c, where the queue sub-area c2 corresponds to the Classifier-2 and is in the queue area c in the network adapter receiving queue in the serving gateway.

Step 438: The Classifier-2 acquires R2 packets corresponding to the R2 packet identifiers.

Step 439: The Classifier-2 parses the R2 packets to obtain packet characteristic information included in the R2 packets.

Step 440: The Classifier-2 obtains matching entries corresponding to the R2 packets. The Classifier-2 performs a table querying operation using the packet characteristic information included in the R2 packets as table querying key values in order to obtain matching entries corresponding to the R2 packets, where the matching entries corresponding to the R2 packets include flow queue identifiers corresponding to the R2 packets and flow identifiers of service flows to which the R2 packets belong.

Step 441: The Classifier-2 distributes packet description information corresponding to the R2 packets to flow queues corresponding to the flow queue identifiers corresponding to the R2 packets when the Classifier-2 detects that the current value of the waiting token is equal to the number of the Classifier-2 (the current value of the waiting token is updated to 2 in step 435, and then is equal to the number 2 of the Classifier-2).

Packet description information corresponding to a packet e2 in the R2 packets is distributed to a flow queue corresponding to a determined flow queue identifier corresponding to the packet e2, and packet description information corresponding to a packet f2 in the R2 packets is distributed to a flow queue corresponding to a determined flow queue identifier corresponding to the packet f2, where the packet e2 and the packet f2 may be any two packets in the R2 packets.

If a time at which the packet e2 is enqueued to the queue sub-area c2 in the queue area c in the network adapter receiving queue is earlier than a time at which the packet f2 is enqueued to the queue sub-area c2 in the queue area c in the network adapter receiving queue, a time at which the packet description information corresponding to the packet e2 is distributed to the flow queue corresponding to the determined flow queue identifier corresponding to the packet e2 is earlier than a time at which the packet description information corresponding to the packet f2 is distributed to the flow queue corresponding to the determined flow queue identifier corresponding to the packet f2.

Step 442: The Classifier-2 updates the current value of the waiting token to 0.

Q2, P2, and R2 are positive integers. A time at which the Q2 packets are enqueued to the queue sub-area b2 in the queue area b in the network adapter receiving queue is later than a time at which the P2 packets are enqueued to the queue sub-area a2 in the queue area a in the network adapter receiving queue, and a time at which the R2 packets are enqueued to the queue sub-area c2 in the queue area c in the network adapter receiving queue is later than the time at which the Q2 packets are enqueued to the queue sub-area b2 in the queue area b in the network adapter receiving queue.

Step 443: The network service processing unit processes the R2 acquired packets, and sends the R2 processed packets. The network service processing unit NT-0 and/or the network service processing unit NT-1 acquires, based on the packet identifiers of the R2 packets, the R2 packets, where the packet identifiers of the R2 packets are included in the packet description information that corresponds to the R2 packets and is distributed to the flow queues, the network service processing unit NT-0 and/or the network service processing unit NT-1 acquires, based on the flow identifiers of the service flows to which the R2 packets belong, flow contexts of the service flows to which the R2 packets belong, where the flow identifiers of the service flows to which the R2 packets belong are included in the packet description information that corresponds to the R2 packets and is distributed to the flow queues, and the network service processing unit NT-0 and/or the network service processing unit NT-1 processes, based on the acquired flow contexts of the service flows to which the R2 packets belong, the R2 acquired packets, and sends the R2 processed packets.

The network service processing unit NT-0 or the network service processing unit NT-1 may acquire, based on a packet identifier of the packet e2, the packet e2, where the packet identifier of the packet e2 is included in the packet description information that corresponds to the packet e2 and is distributed to the flow queue, acquires, based on a flow identifier of a service flow to which the packet e2 belongs, a flow context of the service flow to which the packet e2 belongs, where the flow identifier of the service flow to which the packet e2 belongs is included in the packet description information that corresponds to the packet e2 and is distributed to the flow queue, and processes, based on the acquired flow context of the service flow to which the packet e2 belongs, the acquired packet e2, and sends the processed packet e2. The network service processing unit NT-0 or the network service processing unit NT-1 may acquire, based on a packet identifier of the packet f2, the packet f2, where the packet identifier of the packet f2 is included in the packet description information that corresponds to the packet f2 and is distributed to the flow queue, may acquire, based on a flow identifier of a service flow to which the packet f2 belongs, a flow context of the service flow to which the packet f2 belongs, where the flow identifier of the service flow to which the packet f2 belongs is included in the packet description information that corresponds to the packet f2 and is distributed to the flow queue, and processes, based on the acquired flow context of the service flow to which the packet f2 belongs, the acquired packet f2, and sends the processed packet f2.

It may be understood that steps 423 to 426 may be concurrently executed with steps 430 to 433, and steps 430 to 433 may be concurrently executed with steps 437 to 440.

Further, the Classifier-2 may update a packet address recorded in each area in the network adapter receiving queue. The Classifier-2 may instruct a network adapter to continue to receive a packet. The network adapter enqueues the received packet to the network adapter receiving queue, and then steps 402 to 443 may be cyclically executed.

It can be learned that, in this embodiment, K classifiers and S network service processing units are deployed in a serving gateway. A network adapter receiving queue is divided into multiple queue areas. Each queue area includes multiple queue sub-areas. Each classifier may acquire, in each batch, a packet identifier from a queue sub-area that corresponds to the classifier and is in a queue area in the network adapter receiving queue, that is, the network adapter receiving queue has multiple information reading interfaces such that the K classifiers may concurrently read packet identifiers from corresponding queue areas in the network adapter receiving queue, and the K classifiers may further concurrently determine, based on the packet identifiers acquired by the K classifiers, corresponding flow queue identifiers, related operations before the K classifiers distribute packet description information to flow queues may all be concurrently executed, and concurrent execution makes processing times of the related operations become partially or completely overlapped, and required times and processing complexity of the related operations before the K classifiers distribute the packet description information to the flow queues are generally greater than a required time and processing complexity of an operation that the K classifiers distribute the packet description information to the flow queues. Therefore, multiple software-instance classifiers are introduced to the foregoing solution in this embodiment, which helps to improve a packet distribution processing capability of a serving gateway, and further helps to enable the serving gateway to support a scenario of larger bandwidth.

In addition, a time at which the Q packets are enqueued to a queue area b in the network adapter receiving queue is later than a time at which the P packets are enqueued to a queue area a in the network adapter receiving queue. Therefore, the classifier y distributes, after the classifier x distributes packet description information corresponding to the P packets to flow queues corresponding to determined flow queue identifiers corresponding to the P packets, packet description information corresponding to the Q packets to flow queues corresponding to determined flow queue identifiers corresponding to the Q packets. The foregoing time sequence control helps to meet a sequence preserving requirement of packet distribution to some extent.

In this embodiment, that a network device may be a serving gateway is mainly used as an example. Certainly, the network device that executes the method in this embodiment of the present disclosure may also be a PGW, or a gateway device of another type, or a data-plane convergence node of another type in a communications network.

An embodiment of the present disclosure further provides a related apparatus configured to implement the foregoing solution in the following.

Figure 5:
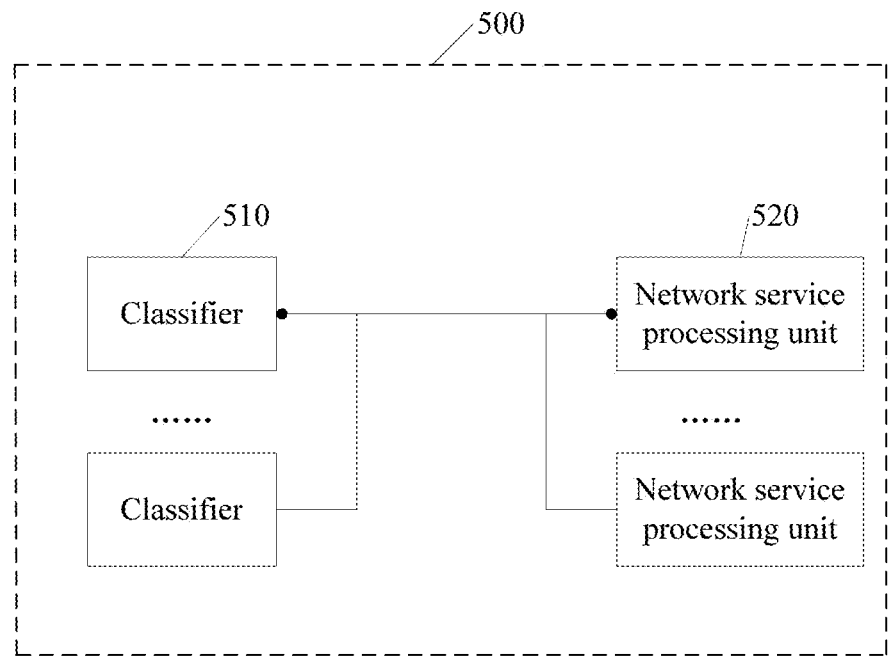
FIG. 5 is a schematic diagram of a packet processing apparatus applied to a network device according to an embodiment of the present disclosure.

Referring to FIG. 5, a packet processing apparatus 500 that is applied to a network device and provided in this embodiment of the present disclosure may include K classifiers 510 and S network service processing units 520, where the K classifiers include a classifier x and a classifier y, and K and S are integers greater than 1.

The classifier x is configured to acquire P packet identifiers from a queue area a that corresponds to the classifier x and is in a network adapter receiving queue, acquire, based on the P packet identifiers, P packets corresponding to the P packet identifiers, determine, based on the P packets, flow queue identifiers corresponding to the P packets, and distribute packet description information corresponding to the P packets to flow queues corresponding to the determined flow queue identifiers corresponding to the P packets, where packet description information corresponding to a packet i in the P packets is distributed to a flow queue corresponding to a determined flow queue identifier corresponding to the packet i, the packet i is any one packet in the P packets, and the packet description information corresponding to the packet i includes a packet identifier of the packet i.

$S_i$ network service processing units in the S network service processing units are configured to process, based on the packet description information that corresponds to the P packets and is distributed to the flow queues, the P packets, and send the P processed packets.

The classifier y is configured to acquire Q packet identifiers from a queue area b that corresponds to the classifier y and is in the network adapter receiving queue, acquire, based on the Q packet identifiers, Q packets corresponding to the Q packet identifiers, determine, based on the Q packets, flow queue identifiers corresponding to the Q packets, and distribute, after the classifier x distributes the packet description information corresponding to the P packets to the flow queues corresponding to the determined flow queue identifiers corresponding to the P packets, packet description information corresponding to the Q packets to flow queues corresponding to the determined flow queue identifiers corresponding to the Q packets, where packet description information corresponding to a packet m in the Q packet is distributed to a flow queue corresponding to a determined flow queue identifier corresponding to the packet m, the packet m is any one packet in the Q packets, the packet description information corresponding to the packet m includes a packet identifier of the packet m, Q and P are positive integers, and a time at which the Q packets are enqueued to the queue area b in the network adapter receiving queue is later than a time at which the P packets are enqueued to the queue area a in the network adapter receiving queue.

$S_j$ network service processing units in the S network service processing units are configured to process, based on the packet description information that corresponds to the Q packets and is distributed to the flow queues, the Q packets, and send the Q processed packets, where an intersection set between the $S_i$ network service processing units and the $S_j$ network service processing units is a null set or a non-null set.

Optionally, in some possible implementation manners of the present disclosure, in an aspect of determining, based on the P packets, the flow queue identifiers corresponding to the P packets, the classifier x may be further configured to parse the P packets to acquire packet characteristic information included in the P packets, and perform, based on the packet characteristic information included in the P packets, a table querying operation in order to obtain matching entries corresponding to the P packets, where the matching entries corresponding to the P packets include the flow queue identifiers corresponding to the P packets.

Optionally, in some possible implementation manners of the present disclosure, in an aspect of determining, based on the Q packets, the flow queue identifiers corresponding to the Q packets, the classifier y may be further configured to parse the Q packets to acquire packet characteristic information included in the Q packets, and perform, based on the acquired packet characteristic information included in the Q packets, a table querying operation in order to obtain matching entries corresponding to the Q packets, where the matching entries corresponding to the Q packets include the flow queue identifiers corresponding to the Q packets.

Optionally, in some possible implementation manners of the present disclosure, the matching entries corresponding to the P packets further include flow identifiers of service flows to which the P packets belong, and the matching entries corresponding to the Q packets further include flow identifiers of service flows to which the Q packets belong.

Optionally, in some possible implementation manners of the present disclosure, the packet description information corresponding to the packet i further includes a flow identifier of a service flow to which the packet i belongs, and the $S_i$ network service processing units may be further configured to acquire, based on the packet identifiers of the P packets, the P packets, where the packet identifiers of the P packets are included in the packet description information that corresponds to the P packets and is distributed to the flow queues, acquire, based on the flow identifiers of the service flows to which the P packets belong, flow contexts of the service flows to which the P packets belong, where the flow identifiers of the service flows to which the P packets belong are included in the packet description information that corresponds to the P packets and is distributed to the flow queues, and process, based on the acquired flow contexts of the service flows to which the P packets belong, the P acquired packets, and send the P processed packets.

Optionally, in some possible implementation manners of the present disclosure, the packet description information corresponding to the packet m further includes a flow identifier of a service flow to which the packet m belongs, and the $S_j$ network service processing units may be further configured to acquire, based on the packet identifiers of the Q packets, the Q packets, where the packet identifiers of the Q packets are included in the packet description information that corresponds to the Q packets and is distributed to the flow queues, acquire, based on the flow identifiers of the service flows to which the Q packets belong, flow contexts of the service flows to which the Q packets belong, where the flow identifiers of the service flows to which the Q packets belong are included in the packet description information that corresponds to the Q packets and is distributed to the flow queues, and process, based on the acquired flow contexts of the service flows to which the Q packets belong, the Q acquired packets, and send the Q processed packets.

Optionally, in some possible implementation manners of the present disclosure, in an aspect of distributing the packet description information corresponding to the P packets to the flow queues identified by the determined flow queue identifiers corresponding to the P packets, the classifier x may be further configured to distribute the packet description information corresponding to the P packets to the flow queues identified by the determined flow queue identifiers corresponding to the P packets when it is detected that a number of the classifier x matches a current first value of a waiting token, where the classifier x may be further configured to update the current first value of the waiting token to a second value according to a preset policy.

In an aspect in which the classifier y distributes, after the packet description information corresponding to the P packets is distributed to the flow queues corresponding to the determined flow queue identifiers corresponding to the P packets, the packet description information corresponding to the Q packets to the flow queues corresponding to the determined flow queue identifiers corresponding to the Q packets, the classifier y is further configured to distribute the packet description information corresponding to the Q packets to the flow queues identified by the determined flow queue identifiers corresponding to the Q packets when it is detected that a number of the classifier y matches the current second value of the waiting token, where the classifier y may be further configured to update the current second value of the waiting token according to the preset policy, where the second value is greater than the first value, or the second value is less than the first value.

Optionally, in some possible implementation manners of the present disclosure, the P packets further include a packet j, packet description information corresponding to the packet j is distributed by the classifier x to a flow queue corresponding to a determined flow queue identifier corresponding to the packet j, and the packet description information corresponding to the packet j includes a packet identifier of the packet j, a time at which the packet j is enqueued to the queue area a in the network adapter receiving queue is later than a time at which the packet i is enqueued to the queue area a in the network adapter receiving queue, a time at which the packet description information corresponding to the packet j is distributed by the classifier x to the flow queue corresponding to the determined flow queue identifier corresponding to the packet j is later than a time at which the packet description information corresponding to the packet i is distributed by the classifier x to the flow queue corresponding to the determined flow queue identifier corresponding to the packet i, and a time at which the $S_i$ network service processing units process, based on the packet description information that corresponds to the packet j and is distributed to the flow queue, the packet j is later than a time at which the $S_i$ network service processing units process, based on the packet description information that corresponds to the packet i and is distributed to the flow queue, the packet i.

Optionally, in some possible implementation manners of the present disclosure, the Q packets further include a packet n, packet description information corresponding to the packet n is distributed by the classifier y to a flow queue corresponding to a determined flow queue identifier corresponding to the packet n, and the packet description information corresponding to the packet n includes a packet identifier of the packet n, a time at which the packet n is enqueued to the queue area b in the network adapter receiving queue is later than a time at which the packet m is enqueued to the queue area b in the network adapter receiving queue, a time at which the packet description information corresponding to the packet n is distributed by the classifier y to the flow queue corresponding to the determined flow queue identifier corresponding to the packet n is later than a time at which the packet description information corresponding to the packet m is distributed by the classifier y to the flow queue corresponding to the determined flow queue identifier corresponding to the packet m, and a time at which the $S_j$ network service processing units process, based on the packet description information that corresponds to the packet n and is distributed to the flow queue, the packet n is later than a time at which the $S_j$ network service processing units process, based on the packet description information that corresponds to the packet m and is distributed to the flow queue, the packet m.

It may be understood that functions of function modules in the apparatus in this embodiment may be further implemented according to the methods in the foregoing method embodiments. For a specific implementation process, reference may be made to related descriptions of the foregoing method embodiments, and details are not described herein again.

It can be learned that, in this embodiment of the present disclosure, K classifiers and S network service processing units are deployed in a network device, that is, multiple software-instance classifiers and S network service processing units are deployed. A network adapter receiving queue is divided into multiple queue areas. Each classifier may acquire a packet identifier from a queue area that corresponds to the classifier and is in the network adapter receiving queue, that is, the network adapter receiving queue has multiple information reading interfaces such that the K classifiers may concurrently read packet identifiers from corresponding queue areas in the network adapter receiving queue, and the K classifiers may further concurrently determine, based on the packet identifiers acquired by the K classifiers, corresponding flow queue identifiers, related operations before the K classifiers distribute packet description information to flow queues may all be concurrently executed, and concurrent execution makes processing times of the related operations become partially or completely overlapped, and required times and processing complexity of the related operations before the K classifiers distribute the packet description information to the flow queues are generally greater than a required time and processing complexity of an operation that the K classifiers distribute the packet description information to the flow queues. Therefore, multiple software-instance classifiers are introduced to the foregoing solution in this embodiment, which helps to improve a packet distribution processing capability of a network device, and further helps to enable the network device to support a scenario of larger bandwidth.

In addition, a time at which the Q packets are enqueued to a queue area b in the network adapter receiving queue is later than a time at which the P packets are enqueued to a queue area a in the network adapter receiving queue, therefore, the classifier y distributes, after the classifier x distributes packet description information corresponding to the P packets to flow queues corresponding to determined flow queue identifiers corresponding to the P packets, packet description information corresponding to the Q packets to flow queues corresponding to determined flow queue identifiers corresponding to the Q packets. The foregoing time sequence control helps to meet a sequence preserving requirement of packet distribution to some extent.

Figure 6A:
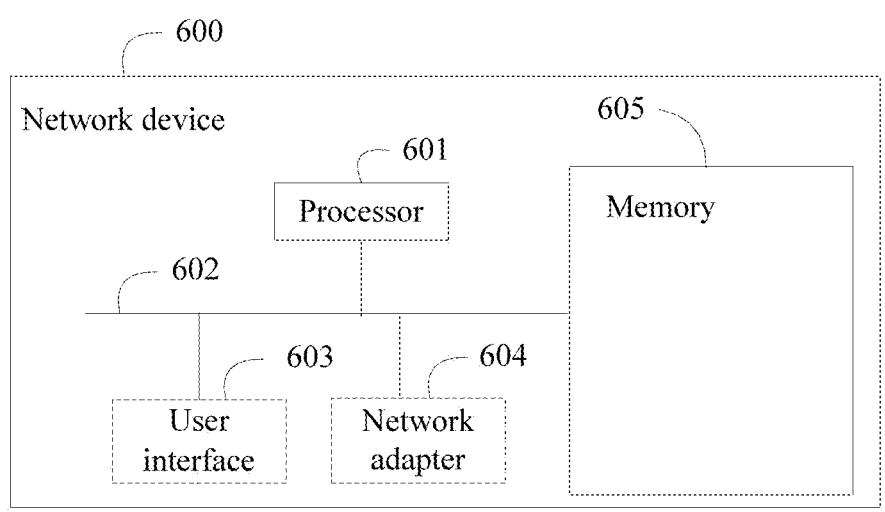
FIG. 6A is a schematic diagram of a network device according to an embodiment of the present disclosure.

Referring to FIG. 6A, FIG. 6A is a structural block diagram of a network device 600 according to another embodiment of the present disclosure. The network device 600 may include at least one processor 601, a memory 605, and at least one communications bus 602, where the communications bus 602 is configured to implement communications connection between these components.

As shown in FIG. 6A, the network device 600 may further include at least one network adapter 604, and optionally includes a user interface 603, where the user interface 603 includes a display (for example, a touchscreen, a liquid crystal display, a holographic imaging (or a projector), a click device (for example, a mouse, a trackball, a touchpad, or a touchscreen), a camera and/or a pickup apparatus, and the like.

The memory 605 may include a read-only memory (ROM) and a random access memory (RAM), and provides an instruction and data for the processor 601. A part of the memory 605 may further include a non-volatile RAM.

Figure 6B:
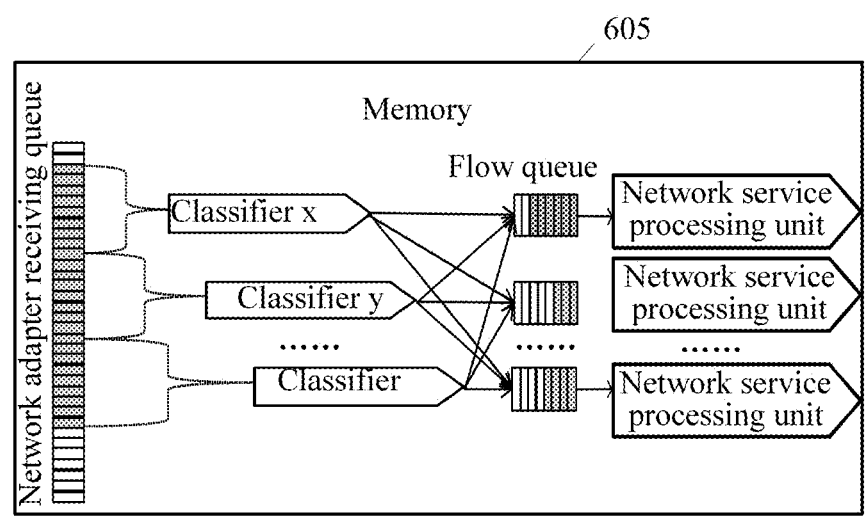
FIG. 6B is a schematic diagram of elements stored in a memory of a network device according to an embodiment of the present disclosure.

In some possible implementation manners, for example, as shown in FIG. 6B, the memory 605 stores the following elements an executable module or a data structure, or a subset thereof, or an extended set thereof, code or an instruction, K classifiers, and S network service processing units, and a network adapter receiving queue, at least one flow queue, and the like may be further included.

In this embodiment of the present disclosure, the processor 601 is configured to execute the code or the instruction in the memory 605 in order to load the K classifiers and the S network service processing units into the memory 605, where the K classifiers include a classifier x and a classifier y, and K and S are integers greater than 1.

The classifier x is configured to acquire P packet identifiers from a queue area a that corresponds to the classifier x and is in the network adapter receiving queue, acquire, based on the P packet identifiers, P packets corresponding to the P packet identifiers, determine, based on the P packets, flow queue identifiers corresponding to the P packets, and distribute packet description information corresponding to the P packets to flow queues corresponding to the determined flow queue identifiers corresponding to the P packets, where packet description information corresponding to a packet i in the P packets is distributed to a flow queue corresponding to a determined flow queue identifier corresponding to the packet i, the packet i is any one packet in the P packets, and the packet description information corresponding to the packet i includes a packet identifier of the packet i.

$S_i$ network service processing units in the S network service processing units are configured to process, based on the packet description information that corresponds to the P packets and is distributed to the flow queues, the P packets, and send the P processed packets.

The classifier y is configured to acquire Q packet identifiers from a queue area b that corresponds to the classifier y and is in the network adapter receiving queue, acquire, based on the Q packet identifiers, Q packets corresponding to the Q packet identifiers, determine, based on the Q packets, flow queue identifiers corresponding to the Q packets, and distribute, after the classifier x distributes the packet description information corresponding to the P packets to the flow queues corresponding to the determined flow queue identifiers corresponding to the P packets, packet description information corresponding to the Q packets to flow queues corresponding to the determined flow queue identifiers corresponding to the Q packets, where packet description information corresponding to a packet m in the Q packet is distributed to a flow queue corresponding to a determined flow queue identifier corresponding to the packet m, the packet m is any one packet in the Q packets, the packet description information corresponding to the packet m includes a packet identifier of the packet m, Q and P are positive integers, and a time at which the Q packets are enqueued to the queue area b in the network adapter receiving queue is later than a time at which the P packets are enqueued to the queue area a in the network adapter receiving queue.

$S_j$ network service processing units in the S network service processing units are configured to process, based on the packet description information that corresponds to the Q packets and is distributed to the flow queues, the Q packets, and send the Q processed packets, where an intersection set between the $S_i$ network service processing units and the $S_j$ network service processing units is a null set or a non-null set.

Optionally, in some possible implementation manners of the present disclosure, in an aspect of acquiring the P packet identifiers from the queue area a that corresponds to the classifier x and is in the network adapter receiving queue, the classifier x is further configured to, after it is found, in a configuration table and based on a number of the classifier x, that a queue area that corresponds to the classifier x and is in the network adapter receiving queue is the queue area a, acquire, by the classifier x, the P packet identifiers from the queue area a corresponding to the classifier x, and in an aspect of acquiring the Q packet identifiers from the queue area b that corresponds to the classifier y and is in the network adapter receiving queue, the classifier y is further configured to, after it is found, in the configuration table and based on a number of the classifier y, that a queue area that corresponds to the classifier y and is in the network adapter receiving queue is the queue area b, acquire, by the classifier y, the Q packet identifiers from the queue area b corresponding to the classifier y.

Optionally, in some possible implementation manners of the present disclosure, in an aspect of determining, based on the P packets, the flow queue identifiers corresponding to the P packets, the classifier x is further configured to parse the P packets to acquire packet characteristic information included in the P packets, and perform, based on the packet characteristic information included in the P packets, a table querying operation in order to obtain matching entries corresponding to the P packets, where the matching entries corresponding to the P packets include the flow queue identifiers corresponding to the P packets, and in an aspect of determining, based on the Q packets, the flow queue identifiers corresponding to the Q packets, the classifier y is further configured to parse the Q packets to acquire packet characteristic information included in the Q packets, and perform, based on the acquired packet characteristic information included in the Q packets, a table querying operation in order to obtain matching entries corresponding to the Q packets, where the matching entries corresponding to the Q packets include the flow queue identifiers corresponding to the Q packets.

Optionally, in some possible implementation manners of the present disclosure, the matching entries corresponding to the P packets further include flow identifiers of service flows to which the P packets belong, and the matching entries corresponding to the Q packets further include flow identifiers of service flows to which the Q packets belong.

Optionally, in some possible implementation manners of the present disclosure, the packet description information corresponding to the packet i further includes a flow identifier of a service flow to which the packet i belongs, and the $S_i$ network service processing units are further configured to acquire, based on the packet identifiers of the P packets, the P packets, where the packet identifiers of the P packets are included in the packet description information that corresponds to the P packets and is distributed to the flow queues, acquire, based on the flow identifiers of the service flows to which the P packets belong, flow contexts of the service flows to which the P packets belong, where the flow identifiers of the service flows to which the P packets belong are included in the packet description information that corresponds to the P packets and is distributed to the flow queues, and process, based on the acquired flow contexts of the service flows to which the P packets belong, the P acquired packets, and send the P processed packets.

Optionally, in some possible implementation manners of the present disclosure, the packet description information corresponding to the packet m further includes a flow identifier of a service flow to which the packet m belongs, and the $S_j$ network service processing units are further configured to acquire, based on the packet identifiers of the Q packets, the Q packets, where the packet identifiers of the Q packets are included in the packet description information that corresponds to the Q packets and is distributed to the flow queues, acquire, based on the flow identifiers of the service flows to which the Q packets belong, flow contexts of the service flows to which the Q packets belong, where the flow identifiers of the service flows to which the Q packets belong are included in the packet description information that corresponds to the Q packets and is distributed to the flow queues, and process, based on the acquired flow contexts of the service flows to which the Q packets belong, the Q acquired packets, and send the Q processed packets.

Optionally, in some possible implementation manners of the present disclosure, in an aspect of distributing the packet description information corresponding to the P packets to the flow queues identified by the determined flow queue identifiers corresponding to the P packets, the classifier x is further configured to distribute the packet description information corresponding to the P packets to the flow queues identified by the determined flow queue identifiers corresponding to the P packets when it is detected that the number of the classifier x matches a current first value of a waiting token, where the classifier x is further configured to update the current first value of the waiting token to a second value according to a preset policy, and in an aspect in which the classifier y distributes, after the packet description information corresponding to the P packets is distributed to the flow queues corresponding to the determined flow queue identifiers corresponding to the P packets, the packet description information corresponding to the Q packets to the flow queues corresponding to the determined flow queue identifiers corresponding to the Q packets, the classifier y is further configured to distribute the packet description information corresponding to the Q packets to the flow queues identified by the determined flow queue identifiers corresponding to the Q packets when it is detected that the number of the classifier y matches the current second value of the waiting token, where the classifier y is further configured to update the current second value of the waiting token according to the preset policy, where the second value is greater than the first value, or the second value is less than the first value.

Optionally, in some possible implementation manners of the present disclosure, the P packets further include a packet j, packet description information corresponding to the packet j is distributed by the classifier x to a flow queue corresponding to a determined flow queue identifier corresponding to the packet j, and the packet description information corresponding to the packet j includes a packet identifier of the packet j, a time at which the packet j is enqueued to the queue area a in the network adapter receiving queue is later than a time at which the packet i is enqueued to the queue area a in the network adapter receiving queue, a time at which the packet description information corresponding to the packet j is distributed by the classifier x to the flow queue corresponding to the determined flow queue identifier corresponding to the packet j is later than a time at which the packet description information corresponding to the packet i is distributed by the classifier x to the flow queue corresponding to the determined flow queue identifier corresponding to the packet i, and a time at which the $S_i$ network service processing units process, based on the packet description information that corresponds to the packet j and is distributed to the flow queue, the packet j is later than a time at which the $S_i$ network service processing units process, based on the packet description information that corresponds to the packet i and is distributed to the flow queue, the packet i.

Optionally, in some possible implementation manners of the present disclosure, the Q packets further include a packet n, packet description information corresponding to the packet n is distributed by the classifier y to a flow queue corresponding to a determined flow queue identifier corresponding to the packet n, and the packet description information corresponding to the packet n includes a packet identifier of the packet n, a time at which the packet n is enqueued to the queue area b in the network adapter receiving queue is later than a time at which the packet m is enqueued to the queue area b in the network adapter receiving queue, a time at which the packet description information corresponding to the packet n is distributed by the classifier y to the flow queue corresponding to the determined flow queue identifier corresponding to the packet n is later than a time at which the packet description information corresponding to the packet m is distributed by the classifier y to the flow queue corresponding to the determined flow queue identifier corresponding to the packet m, and a time at which the $S_j$ network service processing units process, based on the packet description information that corresponds to the packet n and is distributed to the flow queue, the packet n is later than a time at which the $S_j$ network service processing units process, based on the packet description information that corresponds to the packet m and is distributed to the flow queue, the packet m.

It may be understood that functions of function modules in the network device in this embodiment may be further implemented according to the methods in the foregoing method embodiments. For a specific implementation process, reference may be made to related descriptions of the foregoing method embodiments, and details are not described herein again.

In this embodiment, that the network device 600 may be a serving gateway, or a PGW, or a gateway of another type, or a data-plane convergence node of another type in a communications network is mainly used as an example.

It can be learned that, in this embodiment of the present disclosure, K classifiers and S network service processing units are deployed in a network device, that is, multiple software-instance classifiers and S network service processing units are deployed. A network adapter receiving queue is divided into multiple queue areas. Each classifier may acquire a packet identifier from a queue area that corresponds to the classifier and is in the network adapter receiving queue, that is, the network adapter receiving queue has multiple information reading interfaces such that the K classifiers may concurrently read packet identifiers from corresponding queue areas in the network adapter receiving queue, and the K classifiers may further concurrently determine, based on the packet identifiers acquired by the K classifiers, corresponding flow queue identifiers, related operations before the K classifiers distribute packet description information to flow queues may all be concurrently executed, and concurrent execution makes processing times of the related operations become partially or completely overlapped, and required times and processing complexity of the related operations before the K classifiers distribute the packet description information to the flow queues are generally greater than a required time and processing complexity of an operation that the K classifiers distribute the packet description information to the flow queues. Therefore, multiple software-instance classifiers are introduced to the foregoing solution in this embodiment, which helps to improve a packet distribution processing capability of a network device, and further helps to enable the network device to support a scenario of larger bandwidth.

In addition, a time at which the Q packets are enqueued to a queue area b in the network adapter receiving queue is later than a time at which the P packets are enqueued to a queue area a in the network adapter receiving queue. Therefore, the classifier y distributes, after the classifier x distributes packet description information corresponding to the P packets to flow queues corresponding to determined flow queue identifiers corresponding to the P packets, packet description information corresponding to the Q packets to flow queues corresponding to determined flow queue identifiers corresponding to the Q packets. The foregoing time sequence control helps to meet a sequence preserving requirement of packet distribution to some extent.

Referring to FIG. 6A and FIG. 6B, an embodiment of the present disclosure further provides another network device 600, including a memory 605, and a processor 601 connected to the memory 605, where the memory 605 stores code or an instruction, K classifiers, and S network service processing units. It may be understood that the K classifiers and the S network service processing units are K classifiers and S network service processing units that are loaded into the memory during initialization.

The processor 601 is configured to execute the code or the instruction in the memory 605 and execute the K classifiers and the S network service processing units, where the K classifiers include a classifier x and a classifier y, and K and S are integers greater than 1.

The classifier x is configured to acquire P packet identifiers from a queue area a that corresponds to the classifier x and is in a network adapter receiving queue, acquire, based on the P packet identifiers, P packets corresponding to the P packet identifiers, determine, based on the P packets, flow queue identifiers corresponding to the P packets, and distribute packet description information corresponding to the P packets to flow queues corresponding to the determined flow queue identifiers corresponding to the P packets, where packet description information corresponding to a packet i in the P packets is distributed to a flow queue corresponding to a determined flow queue identifier corresponding to the packet i, the packet i is any one packet in the P packets, and the packet description information corresponding to the packet i includes a packet identifier of the packet i.

$S_i$ network service processors in the S network service processors are configured to process, based on the packet description information that corresponds to the P packets and is distributed to the flow queues, the P packets, and send the P processed packets.

The classifier y is configured to acquire Q packet identifiers from a queue area b that corresponds to the classifier y and is in the network adapter receiving queue, acquire, based on the Q packet identifiers, Q packets corresponding to the Q packet identifiers, determine, based on the Q packets, flow queue identifiers corresponding to the Q packets, and distribute, after the classifier x distributes the packet description information corresponding to the P packets to the flow queues corresponding to the determined flow queue identifiers corresponding to the P packets, packet description information corresponding to the Q packets to flow queues corresponding to the determined flow queue identifiers corresponding to the Q packets, where packet description information corresponding to a packet m in the Q packet is distributed to a flow queue corresponding to a determined flow queue identifier corresponding to the packet m, the packet m is any one packet in the Q packets, the packet description information corresponding to the packet m includes a packet identifier of the packet m, Q and P are positive integers, and a time at which the Q packets are enqueued to the queue area b in the network adapter receiving queue is later than a time at which the P packets are enqueued to the queue area a in the network adapter receiving queue.

$S_j$ network service processors in the S network service processors are configured to process, based on the packet description information that corresponds to the Q packets and is distributed to the flow queues, the Q packets, and send the Q processed packets, where an intersection set between the $S_i$ network service processors and the $S_j$ network service processors is a null set or a non-null set.

Optionally, in some possible implementation manners of the present disclosure, in an aspect of acquiring the P packet identifiers from the queue area a that corresponds to the classifier x and is in the network adapter receiving queue, the classifier x is further configured to acquire, by the classifier x, the P packet identifiers from the queue area a corresponding to the classifier x after it is found, in a configuration table and based on a number of the classifier x, that a queue area that corresponds to the classifier x and is in the network adapter receiving queue is the queue area a, and in an aspect of acquiring the Q packet identifiers from the queue area b that corresponds to the classifier y and is in the network adapter receiving queue, the classifier y is further configured to acquire, by the classifier y, the Q packet identifiers from the queue area b corresponding to the classifier y after it is found, in the configuration table and based on a number of the classifier y, that a queue area that corresponds to the classifier y and is in the network adapter receiving queue is the queue area b.

Optionally, in some possible implementation manners of the present disclosure, in an aspect of determining, based on the P packets, the flow queue identifiers corresponding to the P packets, the classifier x is further configured to parse the P packets to acquire packet characteristic information included in the P packets, and perform, based on the packet characteristic information included in the P packets, a table querying operation in order to obtain matching entries corresponding to the P packets, where the matching entries corresponding to the P packets include the flow queue identifiers corresponding to the P packets, and in an aspect of determining, based on the Q packets, the flow queue identifiers corresponding to the Q packets, the classifier y is further configured to parse the Q packets to acquire packet characteristic information included in the Q packets, and perform, based on the acquired packet characteristic information included in the Q packets, a table querying operation in order to obtain matching entries corresponding to the Q packets, where the matching entries corresponding to the Q packets include the flow queue identifiers corresponding to the Q packets.

Optionally, in some possible implementation manners of the present disclosure, the matching entries corresponding to the P packets further include flow identifiers of service flows to which the P packets belong, and the matching entries corresponding to the Q packets further include flow identifiers of service flows to which the Q packets belong.

Optionally, in some possible implementation manners of the present disclosure, the packet description information corresponding to the packet i further includes a flow identifier of a service flow to which the packet i belongs, and the $S_i$ network service processing units are further configured to acquire, based on the packet identifiers of the P packets, the P packets, where the packet identifiers of the P packets are included in the packet description information that corresponds to the P packets and is distributed to the flow queues, acquire, based on the flow identifiers of the service flows to which the P packets belong, flow contexts of the service flows to which the P packets belong, where the flow identifiers of the service flows to which the P packets belong are included in the packet description information that corresponds to the P packets and is distributed to the flow queues, and process, based on the acquired flow contexts of the service flows to which the P packets belong, the P acquired packets, and send the P processed packets.

Optionally, in some possible implementation manners of the present disclosure, the packet description information corresponding to the packet m further includes a flow identifier of a service flow to which the packet m belongs, and the $S_j$ network service processing units are further configured to acquire, based on the packet identifiers of the Q packets, the Q packets, where the packet identifiers of the Q packets are included in the packet description information that corresponds to the Q packets and is distributed to the flow queues, acquire, based on the flow identifiers of the service flows to which the Q packets belong, flow contexts of the service flows to which the Q packets belong, where the flow identifiers of the service flows to which the Q packets belong are included in the packet description information that corresponds to the Q packets and is distributed to the flow queues, and process, based on the acquired flow contexts of the service flows to which the Q packets belong, the Q acquired packets, and send the Q processed packets.

Optionally, in some possible implementation manners of the present disclosure, in an aspect of distributing the packet description information corresponding to the P packets to the flow queues identified by the determined flow queue identifiers corresponding to the P packets, the classifier x is further configured to distribute the packet description information corresponding to the P packets to the flow queues identified by the determined flow queue identifiers corresponding to the P packets when it is detected that the number of the classifier x matches a current first value of a waiting token, where the classifier x is further configured to update the current first value of the waiting token to a second value according to a preset policy, and in an aspect in which the classifier y distributes, after the packet description information corresponding to the P packets is distributed to the flow queues corresponding to the determined flow queue identifiers corresponding to the P packets, the packet description information corresponding to the Q packets to the flow queues corresponding to the determined flow queue identifiers corresponding to the Q packets, the classifier y is further configured to distribute the packet description information corresponding to the Q packets to the flow queues identified by the determined flow queue identifiers corresponding to the Q packets when it is detected that the number of the classifier y matches the current second value of the waiting token, where the classifier y is further configured to update the current second value of the waiting token according to the preset policy, where the second value is greater than the first value, or the second value is less than the first value.

Optionally, in some possible implementation manners of the present disclosure, the P packets further include a packet j, packet description information corresponding to the packet j is distributed by the classifier x to a flow queue corresponding to a determined flow queue identifier corresponding to the packet j, and the packet description information corresponding to the packet j includes a packet identifier of the packet j, a time at which the packet j is enqueued to the queue area a in the network adapter receiving queue is later than a time at which the packet i is enqueued to the queue area a in the network adapter receiving queue, a time at which the packet description information corresponding to the packet j is distributed by the classifier x to the flow queue corresponding to the determined flow queue identifier corresponding to the packet j is later than a time at which the packet description information corresponding to the packet i is distributed by the classifier x to the flow queue corresponding to the determined flow queue identifier corresponding to the packet i, and a time at which the $S_i$ network service processing units process, based on the packet description information that corresponds to the packet j and is distributed to the flow queue, the packet j is later than a time at which the $S_i$ network service processing units process, based on the packet description information that corresponds to the packet i and is distributed to the flow queue, the packet i.

Optionally, in some possible implementation manners of the present disclosure, the Q packets further include a packet n, packet description information corresponding to the packet n is distributed by the classifier y to a flow queue corresponding to a determined flow queue identifier corresponding to the packet n, and the packet description information corresponding to the packet n includes a packet identifier of the packet n, a time at which the packet n is enqueued to the queue area b in the network adapter receiving queue is later than a time at which the packet m is enqueued to the queue area b in the network adapter receiving queue, a time at which the packet description information corresponding to the packet n is distributed by the classifier y to the flow queue corresponding to the determined flow queue identifier corresponding to the packet n is later than a time at which the packet description information corresponding to the packet m is distributed by the classifier y to the flow queue corresponding to the determined flow queue identifier corresponding to the packet m, and a time at which the $S_j$ network service processing units process, based on the packet description information that corresponds to the packet n and is distributed to the flow queue, the packet n is later than a time at which the $S_j$ network service processing units process, based on the packet description information that corresponds to the packet m and is distributed to the flow queue, the packet m.

It may be understood that functions of function modules in the network device in this embodiment may be further implemented according to the methods in the foregoing method embodiments. For a specific implementation process, reference may be made to related descriptions of the foregoing method embodiments, and details are not described herein again.

An embodiment of the present disclosure further provides a computer storage medium, where the computer storage medium may store a program, and when the program is executed, a part or all of steps of any packet processing method that is applied to a network device and described in the foregoing method embodiments are included.

In several embodiments provided in the present application, it should be understood that the disclosed apparatus may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The integrated unit may be stored in a computer-readable storage medium when the integrated unit is implemented in a form of a software functional unit and sold or used as an independent product. Based on such an understanding, the technical solutions of the present disclosure essentially, or the part contributing to the prior art, or all or some of the technical solutions may be implemented in a form of a software product. The software product is stored in a storage medium and includes several instructions for instructing a computer device (which may be a personal computer, a server, a network device, or the like, and may further be a processor in a computer device) to perform all or some of the steps of the foregoing methods described in the embodiments of the present disclosure. The foregoing storage medium may include any medium that can store program code, such as a universal serial bus (USB) flash drive, a removable hard disk, a magnetic disk, an optical disc, a ROM, or a RAM.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof. However, these modifications or replacements do not make the essence of corresponding technical solutions depart from the spirit and scope of the technical solutions in the embodiments of the present disclosure.

What is claimed is:

1. A packet processing method applied to a network device, wherein K classifiers and S network service processors are loaded into a memory of the network device, wherein the K classifiers comprise a classifier x and a classifier y, wherein K and S are integers greater than 1, and wherein the method comprises:
   acquiring, by the classifier x, P packet identifiers from a queue area a corresponding to the classifier x and is in a network adapter receiving queue;
   acquiring, by the classifier x and based on the P packet identifiers, P packets corresponding to the P packet identifiers;
   determining, by the classifier x and based on the P packets, flow queue identifiers corresponding to the P packets;
   distributing, by the classifier x, packet description information corresponding to the P packets to flow queues corresponding to the determined flow queue identifiers corresponding to the P packets, wherein packet description information corresponding to a packet i in the P packets is distributed to a flow queue corresponding to a determined flow queue identifier corresponding to the packet i, wherein the packet i is any one packet in the P packets, and wherein the packet description information corresponding to the packet i comprises a packet identifier of the packet i;
   processing, by $S_i$ network service processors in the S network service processors and based on the packet description information corresponding to the P packets and is distributed to the flow queues, the P packets;
   sending the P processed packets;
   acquiring, by the classifier y, Q packet identifiers from a queue area b corresponding to the classifier y and is in the network adapter receiving queue;
   acquiring, by the classifier y and based on the Q packet identifiers, Q packets corresponding to the Q packet identifiers;
   determining, by the classifier y and based on the Q packets, flow queue identifiers corresponding to the Q packets;
   distributing, by the classifier y after the classifier x distributes the packet description information corresponding to the P packets to the flow queues corresponding to the determined flow queue identifiers corresponding to the P packets, packet description information corresponding to the Q packets to flow queues corresponding to the determined flow queue identifiers corresponding to the Q packets, wherein packet description information corresponding to a packet m in the Q packet is distributed to a flow queue corresponding to a determined flow queue identifier corresponding to the packet m, wherein the packet m is any one packet in the Q packets, wherein the packet description information corresponding to the packet m comprises a packet identifier of the packet m, wherein Q and P are positive integers, and wherein a time at which the Q packets are enqueued to the queue area b in the network adapter receiving queue is later than a time at which the P packets are enqueued to the queue area a in the network adapter receiving queue;

processing, by $S_j$ network service processors in the S network service processors and based on the packet description information corresponding to the Q packets and is distributed to the flow queues, the Q packets; and sending the Q processed packets, wherein an intersection set between the $S_i$ network service processors and the $S_j$ network service processors is a null set or a non-null set.

2. The method according to claim 1, wherein acquiring the P packet identifiers comprises acquiring, by the classifier x, the P packet identifiers from the queue area a corresponding to the classifier x after the classifier x finds, in a configuration table and based on a number of the classifier x, the queue area corresponding to the classifier x and is in the network adapter receiving queue is the queue area a, and wherein acquiring the Q packet identifiers comprises acquiring, by the classifier y, the Q packet identifiers from the queue area b corresponding to the classifier y after the classifier y finds, in the configuration table and based on a number of the classifier y, the queue area corresponding to the classifier y and is in the network adapter receiving queue is the queue area b.

3. The method according to claim 1, wherein determining the flow queue identifiers corresponding to the P packets comprises:

parsing, by the classifier x, the P packets to acquire packet characteristic information comprised in the P packets; and performing, by the classifier x and based on the packet characteristic information comprised in the P packets, a table querying operation in order to obtain matching entries corresponding to the P packets, wherein the matching entries corresponding to the P packets comprise the flow queue identifiers corresponding to the P packets, and wherein determining the flow queue identifiers corresponding to the Q packets comprises:

parsing, by the classifier y, the Q packets to acquire packet characteristic information comprised in the Q packets; and performing, by the classifier y and based on the acquired packet characteristic information comprised in the Q packets, the table querying operation in order to obtain matching entries corresponding to the Q packets, wherein the matching entries corresponding to the Q packets comprise the flow queue identifiers corresponding to the Q packets.

4. The method according to claim 3, wherein the matching entries corresponding to the P packets further comprise flow identifiers of service flows to which the P packets belong, and wherein the matching entries corresponding to the Q packets further comprise flow identifiers of service flows to which the Q packets belong.

5. The method according to claim 4, wherein the packet description information corresponding to the packet i further comprises a flow identifier of a service flow to which the packet i belongs, wherein processing the P packets, and sending the P processed packets comprises:

acquiring, by the $S_i$ network service processors and based on the packet identifiers of the P packets, the P packets, wherein the packet identifiers of the P packets are comprised in the packet description information corresponding to the P packets and is distributed to the flow queues;

acquiring, by the $S_i$ network service processors and based on the flow identifiers of the service flows to which the P packets belong, flow contexts of the service flows to which the P packets belong, wherein the flow identifiers of the service flows to which the P packets belong are comprised in the packet description information corresponding to the P packets and is distributed to the flow queues;

processing, by the $S_i$ network service processors and based on the acquired flow contexts of the service flows to which the P packets belong, the P acquired packets; and sending the P processed packets, wherein the packet description information corresponding to the packet m further comprises a flow identifier of a service flow to which the packet m belongs, and wherein processing the Q packets, and sending the Q processed packets comprises:

acquiring, by the $S_j$ network service processors and based on the packet identifiers of the Q packets, the Q packets, wherein the packet identifiers of the Q packets are comprised in the packet description information corresponding to the Q packets and is distributed to the flow queues;

acquiring, by the $S_j$ network service processors and based on the flow identifiers of the service flows to which the Q packets belong, flow contexts of the service flows to which the Q packets belong, wherein the flow identifiers of the service flows to which the Q packets belong are comprised in the packet description information corresponding to the Q packets and is distributed to the flow queues;

processing, by the $S_j$ network service processors and based on the acquired flow contexts of the service flows to which the Q packets belong, the Q acquired packets; and sending the Q processed packets.

6. The method according to claim 1, wherein a waiting token is stored in the memory of the network device, wherein distributing the packet description information corresponding to the P packets comprises distributing, by the classifier x, the packet description information corresponding to the P packets to the flow queues identified by the determined flow queue identifiers corresponding to the P packets when the classifier x detects a number of the classifier x matches a current first value of the waiting token, wherein the method further comprises updating, by the classifier x, the current first value of the waiting token to a second value according to a preset policy, wherein distributing the packet description information corresponding to the Q packets comprises distributing, by the classifier y, the packet description information corresponding to the Q packets to the flow queues identified by the determined flow queue identifiers corresponding to the Q packets when the classifier y detects a number of the classifier y matches the current second value of the waiting token, and wherein the method further comprises updating, by the classifier y, the current second value of the waiting token according to the preset policy, wherein the second value is greater than the first value, or the second value is less than the first value.

7. The method according to claim 1, wherein the P packets further comprise a packet j, wherein packet description information corresponding to the packet j is distributed to a flow queue corresponding to a determined flow queue identifier corresponding to the packet j, wherein the packet description information corresponding to the packet j comprises a packet identifier of the packet j, wherein a time at which the packet j is enqueued to the queue area a in the network adapter receiving queue is later than a time at which the packet i is enqueued to the queue area a in the network adapter receiving queue, wherein a time at which the packet description information corresponding to the packet j is distributed to the flow queue corresponding to the determined flow queue identifier corresponding to the packet j is later than a time at which the packet description information corresponding to the packet i is distributed to the flow queue corresponding to the determined flow queue identifier corresponding to the packet i, wherein a time at which the $S_i$ network service processors process, based on the packet description information corresponding to the packet j and is distributed to the flow queue, the packet j is later than a time at which the $S_i$ network service processors process, based on the packet description information corresponding to the packet i and is distributed to the flow queue, the packet i, wherein the Q packets further comprise a packet n, wherein packet description information corresponding to the packet n is distributed to a flow queue corresponding to a determined flow queue identifier corresponding to the packet n, wherein the packet description information corresponding to the packet n comprises a packet identifier of the packet n, wherein a time at which the packet n is enqueued to the queue area b in the network adapter receiving queue is later than a time at which the packet m is enqueued to the queue area b in the network adapter receiving queue, wherein a time at which the packet description information corresponding to the packet n is distributed to the flow queue corresponding to the determined flow queue identifier corresponding to the packet n is later than a time at which the packet description information corresponding to the packet m is distributed to the flow queue corresponding to the determined flow queue identifier corresponding to the packet m, and wherein a time at which the $S_j$ network service processors process, based on the packet description information corresponding to the packet n and is distributed to the flow queue, the packet n is later than a time at which the $S_j$ network service processors process, based on the packet description information corresponding to the packet m and is distributed to the flow queue, the packet m.

8. A packet processing apparatus applied to a network device, comprising K classifiers and S network service processors, wherein the K classifiers comprise a classifier x and a classifier y, wherein K and S are integers greater than 1, wherein the classifier x is configured to:
  acquire P packet identifiers from a queue area a corresponding to the classifier x and is in a network adapter receiving queue;
  acquire, based on the P packet identifiers, P packets corresponding to the P packet identifiers;
  determine, based on the P packets, flow queue identifiers corresponding to the P packets; and
  distribute packet description information corresponding to the P packets to flow queues corresponding to the determined flow queue identifiers corresponding to the P packets, wherein packet description information corresponding to a packet i in the P packets is distributed to a flow queue corresponding to a determined flow queue identifier corresponding to the packet i, wherein the packet i is any one packet in the P packets, and wherein the packet description information corresponding to the packet i comprises a packet identifier of the packet i,
wherein $S_i$ network service processors in the S network service processors are configured to:
  process, based on the packet description information corresponding to the P packets and is distributed to the flow queues, the P packets; and
  send the P processed packets,
wherein the classifier y is configured to:
  acquire Q packet identifiers from a queue area b corresponding to the classifier y and is in the network adapter receiving queue;
  acquire, based on the Q packet identifiers, Q packets corresponding to the Q packet identifiers;
  determine, based on the Q packets, flow queue identifiers corresponding to the Q packets; and
  distribute, after the classifier x distributes the packet description information corresponding to the P packets to the flow queues corresponding to the determined flow queue identifiers corresponding to the P packets, packet description information corresponding to the Q packets to flow queues corresponding to the determined flow queue identifiers corresponding to the Q packets, wherein packet description information corresponding to a packet m in the Q packet is distributed to a flow queue corresponding to a determined flow queue identifier corresponding to the packet m, wherein the packet m is any one packet in the Q packets, wherein the packet description information corresponding to the packet m comprises a packet identifier of the packet m, wherein Q and P are positive integers, and wherein a time at which the Q packets are enqueued to the queue area b in the network adapter receiving queue is later than a time at which the P packets are enqueued to the queue area a in the network adapter receiving queue, and
wherein $S_j$ network service processors in the S network service processors are configured to:
  process, based on the packet description information corresponding to the Q packets and is distributed to the flow queues, the Q packets; and
  send the Q processed packets, wherein an intersection set between the $S_i$ network service processors and the $S_j$ network service processors is a null set or a non-null set.

9. The apparatus according to claim 8, wherein when determining the flow queue identifiers corresponding to the P packets, the classifier x is further configured to:
  parse the P packets to acquire packet characteristic information comprised in the P packets; and
  perform, based on the packet characteristic information comprised in the P packets, a table querying operation in order to obtain matching entries corresponding to the P packets, wherein the matching entries corresponding to the P packets comprise the flow queue identifiers corresponding to the P packets, and wherein when determining the flow queue identifiers corresponding to the Q packets, the classifier y is further configured to:
parse the Q packets to acquire packet characteristic information comprised in the Q packets; and
perform, based on the acquired packet characteristic information comprised in the Q packets, the table querying operation in order to obtain matching entries corresponding to the Q packets, wherein the matching entries corresponding to the Q packets comprise the flow queue identifiers corresponding to the Q packets.

10. The apparatus according to claim 9, wherein the matching entries corresponding to the P packets further comprise flow identifiers of service flows to which the P packets belong, and wherein the matching entries corresponding to the Q packets further comprise flow identifiers of service flows to which the Q packets belong.

11. The apparatus according to claim 10, wherein the packet description information corresponding to the packet i further comprises a flow identifier of a service flow to which the packet i belongs, wherein the $S_i$ network service processors are further configured to:
acquire, based on the packet identifiers of the P packets, the P packets, wherein the packet identifiers of the P packets are comprised in the packet description information corresponding to the P packets and is distributed to the flow queues;
acquire, based on the flow identifiers of the service flows to which the P packets belong, flow contexts of the service flows to which the P packets belong, wherein the flow identifiers of the service flows to which the P packets belong are comprised in the packet description information corresponding to the P packets and is distributed to the flow queues;
process, based on the acquired flow contexts of the service flows to which the P packets belong, the P acquired packets; and
send the P processed packets,
wherein the packet description information corresponding to the packet m further comprises a flow identifier of a service flow to which the packet m belongs, and
wherein the $S_j$ network service processors are further configured to:
acquire, based on the packet identifiers of the Q packets, the Q packets, wherein the packet identifiers of the Q packets are comprised in the packet description information corresponding to the Q packets and is distributed to the flow queues;
acquire, based on the flow identifiers of the service flows to which the Q packets belong, flow contexts of the service flows to which the Q packets belong, wherein the flow identifiers of the service flows to which the Q packets belong are comprised in the packet description information corresponding to the Q packets and is distributed to the flow queues;
process, based on the acquired flow contexts of the service flows to which the Q packets belong, the Q acquired packets; and
send the Q processed packets.

12. The apparatus according to claim 8, wherein when distributing the packet description information corresponding to the P packets, the classifier x is further configured to:
distribute the packet description information corresponding to the P packets to the flow queues identified by the determined flow queue identifiers corresponding to the P packets when it is detected that a number of the classifier x matches a current first value of a waiting token; and
update the current first value of the waiting token to a second value according to a preset policy, and
wherein when distributing the packet description information corresponding to the Q packets, the classifier y is further configured to:
distribute the packet description information corresponding to the Q packets to the flow queues identified by the determined flow queue identifiers corresponding to the Q packets when it is detected that a number of the classifier y matches the current second value of the waiting token; and
update the current second value of the waiting token according to the preset policy, wherein the second value is greater than the first value, or the second value is less than the first value.

13. The apparatus according to claim 8, wherein the P packets further comprise a packet j, wherein packet description information corresponding to the packet j is distributed by the classifier x to a flow queue corresponding to a determined flow queue identifier corresponding to the packet j, wherein the packet description information corresponding to the packet j comprises a packet identifier of the packet j, wherein a time at which the packet j is enqueued to the queue area a in the network adapter receiving queue is later than a time at which the packet i is enqueued to the queue area a in the network adapter receiving queue, wherein a time at which the packet description information corresponding to the packet j is distributed by the classifier x to the flow queue corresponding to the determined flow queue identifier corresponding to the packet j is later than a time at which the packet description information corresponding to the packet i is distributed by the classifier x to the flow queue corresponding to the determined flow queue identifier corresponding to the packet i, wherein a time at which the $S_i$ network service processors process, based on the packet description information corresponding to the packet j and is distributed to the flow queue, the packet j is later than a time at which the $S_i$ network service processors process, based on the packet description information corresponding to the packet i and is distributed to the flow queue, the packet i, wherein the Q packets further comprise a packet n, wherein packet description information corresponding to the packet n is distributed by the classifier y to a flow queue corresponding to a determined flow queue identifier corresponding to the packet n, wherein the packet description information corresponding to the packet n comprises a packet identifier of the packet n, wherein a time at which the packet n is enqueued to the queue area b in the network adapter receiving queue is later than a time at which the packet m is enqueued to the queue area b in the network adapter receiving queue, wherein a time at which the packet description information corresponding to the packet n is distributed by the classifier y to the flow queue corresponding to the determined flow queue identifier corresponding to the packet n is later than a time at which the packet description information corresponding to the packet m is distributed by the classifier y to the flow queue corresponding to the determined flow queue identifier corresponding to the packet m, and wherein a time at which the $S_j$ network service processors process, based on the packet description information corresponding to the packet n and is distributed to the flow queue, the packet n is later than a time at which the $S_j$ network service processors process, based on the packet description information corresponding to the packet m and is distributed to the flow queue, the packet m.

14. A network device, comprising:
a memory;
and a processor connected to the memory and configured to load K classifiers and S network service processors into the memory, wherein the K classifiers comprise a classifier x and a classifier y, wherein K and S are integers greater than 1,
wherein the classifier x is configured to:
acquire P packet identifiers from a queue area a corresponding to the classifier x and is in a network adapter receiving queue;
acquire, based on the P packet identifiers, P packets corresponding to the P packet identifiers;
determine, based on the P packets, flow queue identifiers corresponding to the P packets; and
distribute packet description information corresponding to the P packets to flow queues corresponding to the determined flow queue identifiers corresponding to the P packets, wherein the packet description information corresponding to a packet i in the P packets is distributed to a flow queue corresponding to a determined flow queue identifier corresponding to the packet i, wherein the packet i is any one packet in the P packets, and wherein the packet description information corresponding to the packet i comprises a packet identifier of the packet i,
wherein $S_i$ network service processors in the S network service processors are configured to:
process, based on the packet description information corresponding to the P packets and is distributed to the flow queues, the P packets; and
send the P processed packets,
wherein the classifier y is configured to:
acquire Q packet identifiers from a queue area b corresponding to the classifier y and is in the network adapter receiving queue;
acquire, based on the Q packet identifiers, Q packets corresponding to the Q packet identifiers;
determine, based on the Q packets, flow queue identifiers corresponding to the Q packets; and
distribute, after the classifier x distributes the packet description information corresponding to the P packets to the flow queues corresponding to the determined flow queue identifiers corresponding to the P packets, packet description information corresponding to the Q packets to flow queues corresponding to the determined flow queue identifiers corresponding to the Q packets, wherein packet description information corresponding to a packet m in the Q packet is distributed to a flow queue corresponding to a determined flow queue identifier corresponding to the packet m, wherein the packet m is any one packet in the Q packets, wherein the packet description information corresponding to the packet m comprises a packet identifier of the packet m, wherein Q and P are positive integers, and wherein a time at which the Q packets are enqueued to the queue area b in the network adapter receiving queue is later than a time at which the P packets are enqueued to the queue area a in the network adapter receiving queue, and wherein $S_j$ network service processors in the S network service processors are configured to: process, based on the packet description information corresponding to the Q packets and is distributed to the flow queues, the Q packets; and send the Q processed packets, wherein an intersection set between the $S_i$ network service processors and the $S_j$ network service processors is a null set or a non-null set.

15. The network device according to claim 14, wherein when acquiring the P packet identifiers from the queue area a, the classifier x is further configured to acquire, by the classifier x, the P packet identifiers from the queue area a corresponding to the classifier x after it is found, in a configuration table and based on a number of the classifier x, the queue area corresponding to the classifier x and is in the network adapter receiving queue is the queue area a, and wherein when acquiring the Q packet identifiers from the queue area b, the classifier y is further configured to acquire, by the classifier y, the Q packet identifiers from the queue area b corresponding to the classifier y after it is found, in the configuration table and based on a number of the classifier y, the queue area corresponding to the classifier y and is in the network adapter receiving queue is the queue area b.

16. The network device according to claim 14, wherein when determining the flow queue identifiers corresponding to the P packets, the classifier x is further configured to:
parse the P packets to acquire packet characteristic information comprised in the P packets; and
perform, based on the packet characteristic information comprised in the P packets, a table querying operation in order to obtain matching entries corresponding to the P packets, wherein the matching entries corresponding to the P packets comprise the flow queue identifiers corresponding to the P packets, and
wherein when determining the flow queue identifiers corresponding to the Q packets, the classifier y is further configured to:
parse the Q packets to acquire packet characteristic information comprised in the Q packets; and
perform, based on the acquired packet characteristic information comprised in the Q packets, the table querying operation in order to obtain matching entries corresponding to the Q packets, wherein the matching entries corresponding to the Q packets comprise the flow queue identifiers corresponding to the Q packets.

17. The network device according to claim 16, wherein the matching entries corresponding to the P packets further comprise flow identifiers of service flows to which the P packets belong, and wherein the matching entries corresponding to the Q packets further comprise flow identifiers of service flows to which the Q packets belong.

18. The network device according to claim 17, wherein the packet description information corresponding to the packet i further comprises a flow identifier of a service flow to which the packet i belongs, wherein the $S_i$ network service processors are further configured to:
acquire, based on the packet identifiers of the P packets, the P packets, wherein the packet identifiers of the P packets are comprised in the packet description information corresponding to the P packets and is distributed to the flow queues;
acquire, based on the flow identifiers of the service flows to which the P packets belong, flow contexts of the service flows to which the P packets belong, wherein the flow identifiers of the service flows to which the P packets belong are comprised in the packet description information corresponding to the P packets and is distributed to the flow queues;
process, based on the acquired flow contexts of the service flows to which the P packets belong, the P acquired packets; and send the P processed packets,
wherein the packet description information corresponding to the packet m further comprises a flow identifier of a service flow to which the packet m belongs, and
wherein the $S_j$ network service processors are further configured to:
  acquire, based on the packet identifiers of the Q packets, the Q packets, wherein the packet identifiers of the Q packets are comprised in the packet description information corresponding to the Q packets and is distributed to the flow queues;
  acquire, based on the flow identifiers of the service flows to which the Q packets belong, flow contexts of the service flows to which the Q packets belong, wherein the flow identifiers of the service flows to which the Q packets belong are comprised in the packet description information corresponding to the Q packets and is distributed to the flow queues;
  process, based on the acquired flow contexts of the service flows to which the Q packets belong, the Q acquired packets; and
  send the Q processed packets.

19. The network device according to claim 14, wherein when distributing the packet description information corresponding to the P packets, the classifier x is further configured to:
  distribute the packet description information corresponding to the P packets to the flow queues identified by the determined flow queue identifiers corresponding to the P packets when it is detected a number of the classifier x matches a current first value of a waiting token; and
  update the current first value of the waiting token to a second value according to a preset policy, and
wherein when distributing the packet description information corresponding to the Q packets, the classifier y is further configured to:
  distribute the packet description information corresponding to the Q packets to the flow queues identified by the determined flow queue identifiers corresponding to the Q packets when it is detected a number of the classifier y matches the current second value of the waiting token; and
  update the current second value of the waiting token according to the preset policy, wherein the second value is greater than the first value, or the second value is less than the first value.

20. The network device according to claim 14, wherein the P packets further comprise a packet j, wherein packet description information corresponding to the packet j is distributed by the classifier x to a flow queue corresponding to a determined flow queue identifier corresponding to the packet j, wherein the packet description information corresponding to the packet j comprises a packet identifier of the packet j, wherein a time at which the packet j is enqueued to the queue area a in the network adapter receiving queue is later than a time at which the packet i is enqueued to the queue area a in the network adapter receiving queue, wherein a time at which the packet description information corresponding to the packet j is distributed by the classifier x to the flow queue corresponding to the determined flow queue identifier corresponding to the packet j is later than a time at which the packet description information corresponding to the packet i is distributed by the classifier x to the flow queue corresponding to the determined flow queue identifier corresponding to the packet i, wherein a time at which the $S_i$ network service processors process, based on the packet description information corresponding to the packet j and is distributed to the flow queue, the packet j is later than a time at which the $S_i$ network service processors process, based on the packet description information corresponding to the packet i and is distributed to the flow queue, the packet i, wherein the Q packets further comprise a packet n, wherein packet description information corresponding to the packet n is distributed by the classifier y to a flow queue corresponding to a determined flow queue identifier corresponding to the packet n, wherein the packet description information corresponding to the packet n comprises a packet identifier of the packet n, wherein a time at which the packet n is enqueued to the queue area b in the network adapter receiving queue is later than a time at which the packet m is enqueued to the queue area b in the network adapter receiving queue, wherein a time at which the packet description information corresponding to the packet n is distributed by the classifier y to the flow queue corresponding to the determined flow queue identifier corresponding to the packet n is later than a time at which the packet description information corresponding to the packet m is distributed by the classifier y to the flow queue corresponding to the determined flow queue identifier corresponding to the packet m, and wherein a time at which the $S_j$ network service processors process, based on the packet description information corresponding to the packet n and is distributed to the flow queue, the packet n is later than a time at which the $S_j$ network service processors process, based on the packet description information corresponding to the packet m and is distributed to the flow queue, the packet m.

* * * * *